US012709296B2

(12) United States Patent
Tanaka et al.

(10) Patent No.: US 12,709,296 B2
(45) Date of Patent: Aug. 18, 2026

(54) AUTONOMOUS DRIVING ASSISTANCE DEVICE AND AUTONOMOUS DRIVING ASSISTANCE SYSTEM

(71) Applicant: Mitsubishi Electric Corporation, Tokyo (JP)

(72) Inventors: Genki Tanaka, Tokyo (JP); Keisuke Morita, Tokyo (JP); Takuya Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 18/906,282

(22) Filed: Oct. 4, 2024

(65) Prior Publication Data

US 2025/0153734 A1 May 15, 2025

(30) Foreign Application Priority Data

Nov. 14, 2023 (JP) ................................ 2023-193600

(51) Int. Cl.
*B60W 60/00* (2020.01)
*G01C 21/34* (2006.01)

(52) U.S. Cl.
CPC ..... *B60W 60/0011* (2020.02); *G01C 21/3461* (2013.01); *B60W 2554/4041* (2020.02)

(58) Field of Classification Search
None
See application file for complete search history.

(56) References Cited

U.S. PATENT DOCUMENTS 9,631,941 B2 * 4/2017 Sugimoto .............. G06V 20/54
2018/0023966 A1 * 1/2018 Iwai ..................... G08G 1/0969 701/423
2019/0139406 A1 * 5/2019 Adachi .................... G08G 1/09
2020/0004269 A1 * 1/2020 Oba .................... B60W 30/165
2022/0057519 A1 * 2/2022 Goldstein ............... G01S 17/88
2023/0174097 A1 * 6/2023 Kakuta ............... B60W 60/001 701/24
2023/0256998 A1 * 8/2023 Yoshinaga ........ B60W 60/0015 701/23

(Continued)

FOREIGN PATENT DOCUMENTS

WO 2022/208639 A1 10/2022

*Primary Examiner* — Daniel L Greene
*Assistant Examiner* — Robert L Pinkerton
(74) *Attorney, Agent, or Firm* — Sughrue Mion, PLLC

(57) ABSTRACT

Provided are an autonomous driving assistance device and an autonomous driving assistance system capable of determining whether or not a specific area is usable. The autonomous driving assistance device includes: an object detection unit which detects an object from monitoring data of a specific area; a position calculation unit which calculates a position, in the real world, of the object detected by the object detection unit; a map information acquisition unit which acquires a position, in the real world, of the specific area; a determination unit which determines, by using the position of the object calculated by the position calculation unit and the position of the specific area acquired from the map information acquisition unit, whether or not the specific area is usable; and an output unit which outputs a result, of the determination performed by the determination unit, indicating whether or not the specific area is usable.

20 Claims, 18 Drawing Sheets

(56) References Cited

U.S. PATENT DOCUMENTS

| | | | | |
|---|---|---|---|---|
| 2023/0382389 | A1* | 11/2023 | Mochizuki ............ | B60W 40/02 |
| 2025/0271858 | A1* | 8/2025 | Moloney .............. | G05D 1/2462 |
| 2025/0299481 | A1* | 9/2025 | Albert .................. | G06V 10/945 |

* cited by examiner

DYNAMIC MAP: WORLD COORDINATE

CAMERA IMAGE: IMAGE COORDINATE

| LOAD RECEPTION SPACE NO. | USABLE OR NOT |
|---|---|
| A | ○ |
| B | ○ |
| C | ○ |
| D | ○ |
| E | × |
| F | × |
| G | ○ |
| H | ○ |
| I | ○ |

| LOAD RECEPTION SPACE NO. | OCCLUSION SPACE A (RSU_A) | OCCLUSION SPACE B (RSU_B) |
|---|---|---|
| A | – | B |
| B | A | C |
| C | B, A | D |
| D | C, B | E. F |
| E | D, C | F, G |
| F | E, D | G, H |
| G | F | H, I |
| H | G | I |
| I | H | – |

200
AUTONOMOUS DRIVING ASSISTANCE DEVICE
201
SENSOR DATA ACQUISITION UNIT
202
OBJECT DETECTION UNIT
203
POSITION CALCULATION UNIT
205
DETERMINATION UNIT
208
DEGREE-OF-PRIORITY CALCULATION UNIT
206
OUTPUT UNIT
204
MAP INFORMATION ACQUISITION UNIT
210
DEGREE-OF-PRIORITY PARAMETER ACQUISITION UNIT
207
OCCLUSION REGION ACQUISITION UNIT

| DEGREE-OF-PRIORITY PARAMETER | DEGREE-OF-PRIORITY WEIGHT |
|---|---|
| DISTANCE L [m] TO LOAD RECEPTION SPACE | − 0.001 *L |
| PRESENCE OR ABSENCE OF VEHICLE IN ADJACENT LOAD RECEPTION SPACE | +1 (ABSENT)<br>−1 (PRESENT) |
| NECESSITY TO PERFORM DRASTIC TURNING | −0.3 |
| ***. | *** |

AUTONOMOUS DRIVING ASSISTANCE DEVICE AND AUTONOMOUS DRIVING ASSISTANCE SYSTEM

CROSS-REFERENCE TO RELATED APPLICATIONS

This application claims priority to Japanese Patent Application No. 2023-193600, filed Nov. 14, 2023. The disclosure of the above-identified application, including the specification, drawings, and claims, is incorporated by reference herein in its entirety.

BACKGROUND OF THE INVENTION

1. Field of the Invention

The present disclosure relates to an autonomous driving assistance device and an autonomous driving assistance system.

2. Description of the Background Art

In recent years, technologies for realizing autonomous driving have been actively developed. In particular, in order to realize autonomous driving in a specific region, it is contemplated to install and utilize a road-side unit that detects an object in the region and that reports information about the detected object to a vehicle, a traffic controller, or the like. It is possible to contribute to assistance in autonomous driving by reflecting the information about the detected object onto a dynamic map as a map that is referred to when the vehicle performs autonomous driving and that includes obstacle information and the like.

Meanwhile, as a specific region to which autonomous driving is applicable, there is a physical distribution facility, a factory, or the like in which loads are handled. In this specific region, a vehicle such as a trailer for transporting a load is desired to be controlled through autonomous driving so as to be moved to a specific load reception space. The load reception space is a place for performing unloading and loading of loads. When a load transport vehicle is moving to the load reception space, and an object such as a person or another vehicle is present in the load reception space, the load transport vehicle and the object present in the load reception space might collide. Thus, it is desirable to determine presence or absence of an object in the load reception space by any means.

As a method for determining presence or absence of an object in a target area and contributing to deciding an operation of a vehicle, for example, a method that includes determining the extent of congestion in the area of a parking place by a sensor mounted to a road-side unit and guiding the vehicle to another parking place when the area is congested has been disclosed (see, for example, Patent Document 1).

Patent Document 1: WO2022/208639

However, in a physical distribution facility, a factory, or the like in which loads are handled, it is general that a large number of candidates for such a load reception space are present at intervals of several meters. Thus, it is necessary to identify not only information about congestion in the area being monitored by a road-side unit but also the position of an object so as to determine, on a load-reception-space basis, a space in which load reception is possible.

SUMMARY OF THE INVENTION

The present disclosure has been made to solve the above problem, and an object of the present disclosure is to provide an autonomous driving assistance device and an autonomous driving assistance system capable of determining, regarding each of load reception spaces, whether or not the load reception space is usable.

An autonomous driving assistance device according to the present disclosure is an autonomous driving assistance device for determining whether or not a specific area is usable, the autonomous driving assistance device including:

an object detection unit which detects an object from sensor data acquired by a sensor device which monitors the specific area;

a position calculation unit which calculates a position, in the real world, of the object detected by the object detection unit;

a map information acquisition unit which acquires a position, in the real world, of the specific area;

a determination unit which determines, by using the position of the object calculated by the position calculation unit and the position of the specific area acquired from the map information acquisition unit, whether or not the specific area is usable; and an output unit which outputs a result, of the determination performed by the determination unit, indicating whether or not the specific area is usable.

The present disclosure makes it possible to easily determine, regarding each of load reception spaces, whether or not the load reception space is usable. Therefore, the present disclosure enables an autonomous driving vehicle, which has received information about each of the load reception spaces as to whether or not the load reception space is usable, to efficiently move to a usable one of the load reception spaces.

DETAILED DESCRIPTION OF THE PREFERRED EMBODIMENTS OF THE INVENTION

Figure 1:
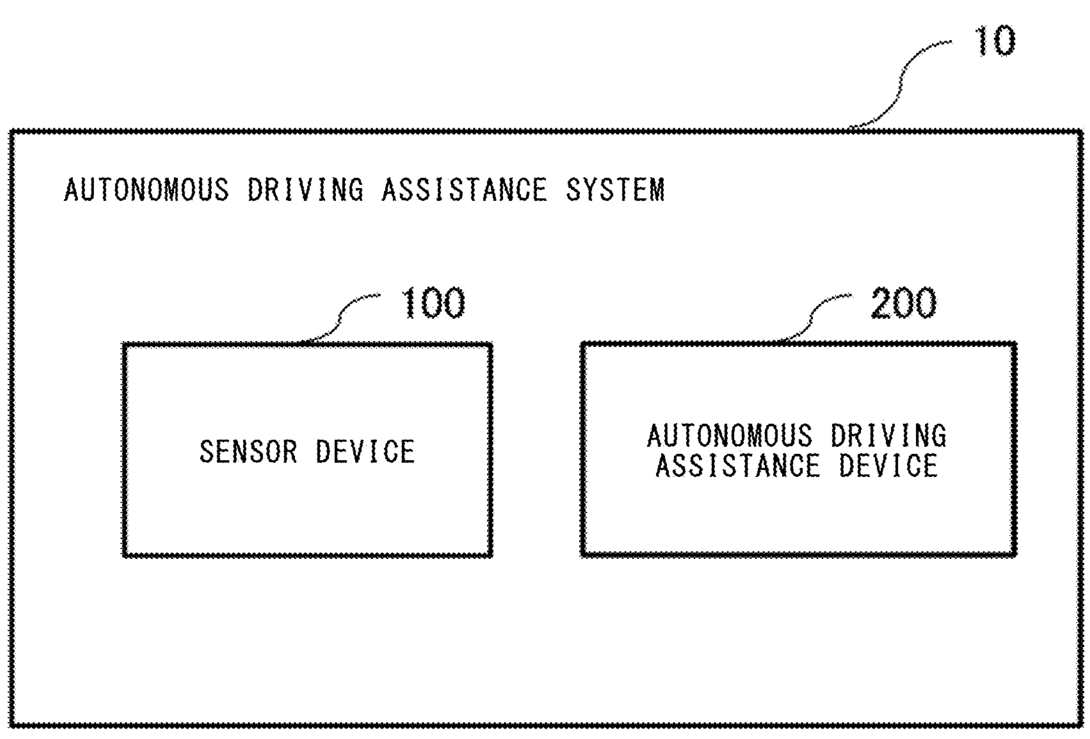
FIG. 1 is a block diagram showing a configuration of an autonomous driving assistance system according to a first embodiment.

Hereinafter, autonomous driving assistance devices and autonomous driving assistance systems according to embodiments of the present disclosure will be described with reference to the drawings. In the drawings, the same or corresponding parts are denoted by the same reference characters. Therefore, the detailed description thereof may be omitted to avoid repeating the description.

First Embodiment

<Configuration of Autonomous Driving Assistance System>

FIG. 1 is a block diagram showing a configuration of an autonomous driving assistance system according to a first embodiment. In the drawing, an autonomous driving assistance system 10 includes: a sensor device 100 which monitors the inside of a specific area, i.e., a preset area, in a physical distribution center and acquires information about an object; and an autonomous driving assistance device 200 which determines, by using the information acquired by the sensor device 100, whether or not a load reception space is usable.

The sensor device 100 is, for example, a road-side unit mounted with a sensor. The sensor mounted to the road-side unit only has to be a sensor that can acquire a position of an object in the area being monitored. Examples of the sensor include not only a camera for acquiring an image of the inside of the region but also a light detection and ranging (LiDAR) sensor or a millimeter-wave radar. In a case where the sensor is a camera, information to be acquired by the sensor is an image. Meanwhile, in a case where the sensor is a LiDAR sensor or the like, the information is sensor data which is a point group.

<Application Example of Autonomous Driving Assistance System>

Next, an overview regarding autonomous driving realized by applying the autonomous driving assistance system 10 will be described with reference to FIG. 2 and FIG. 3 in relation to an example in which the autonomous driving assistance system 10 is applied to a physical distribution center.

Figure 2:
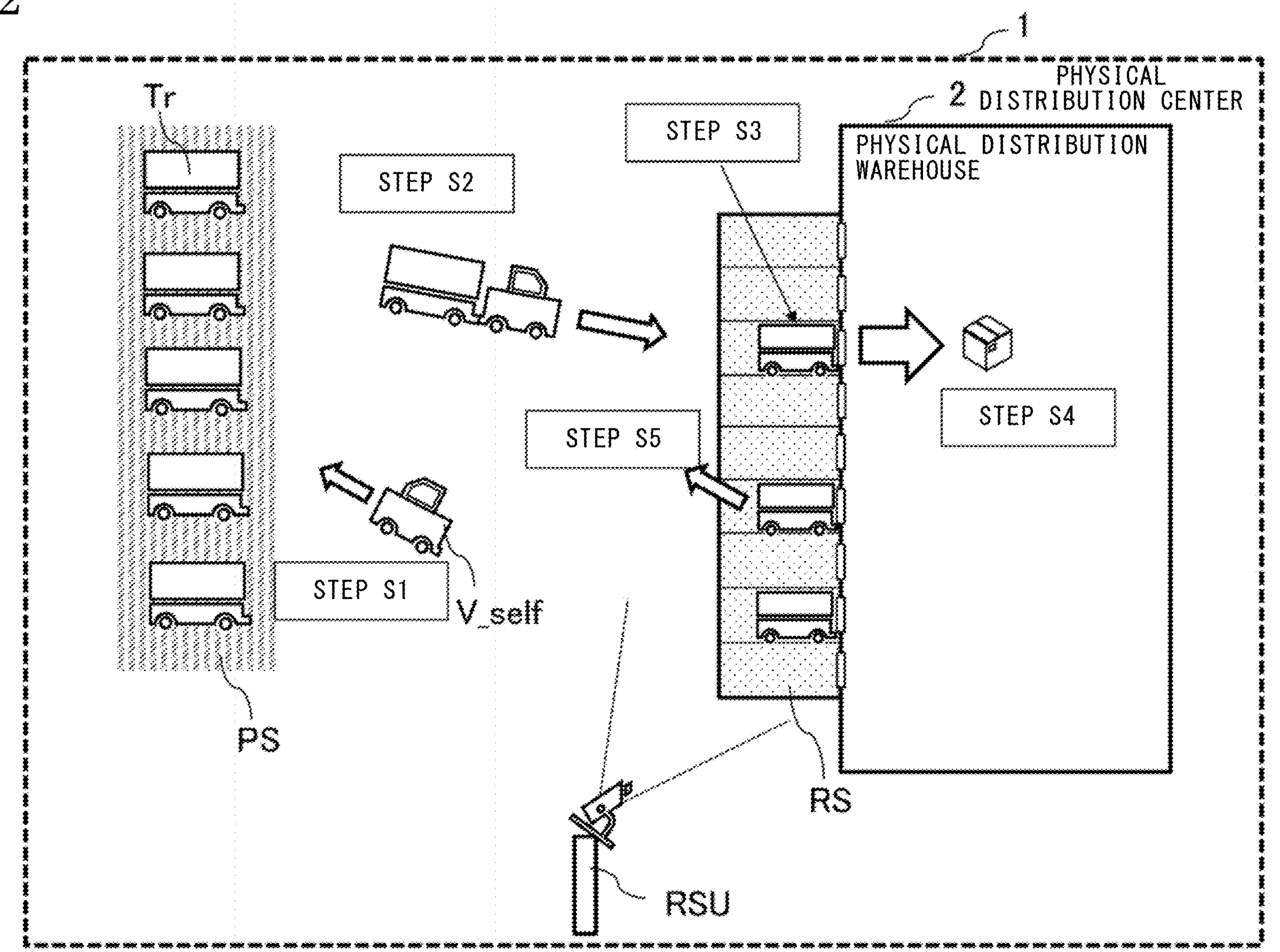
FIG. 2 is a diagram for explaining an operation of an autonomous driving vehicle in a physical distribution center which is an application example of the autonomous driving assistance system.
Figure 3:
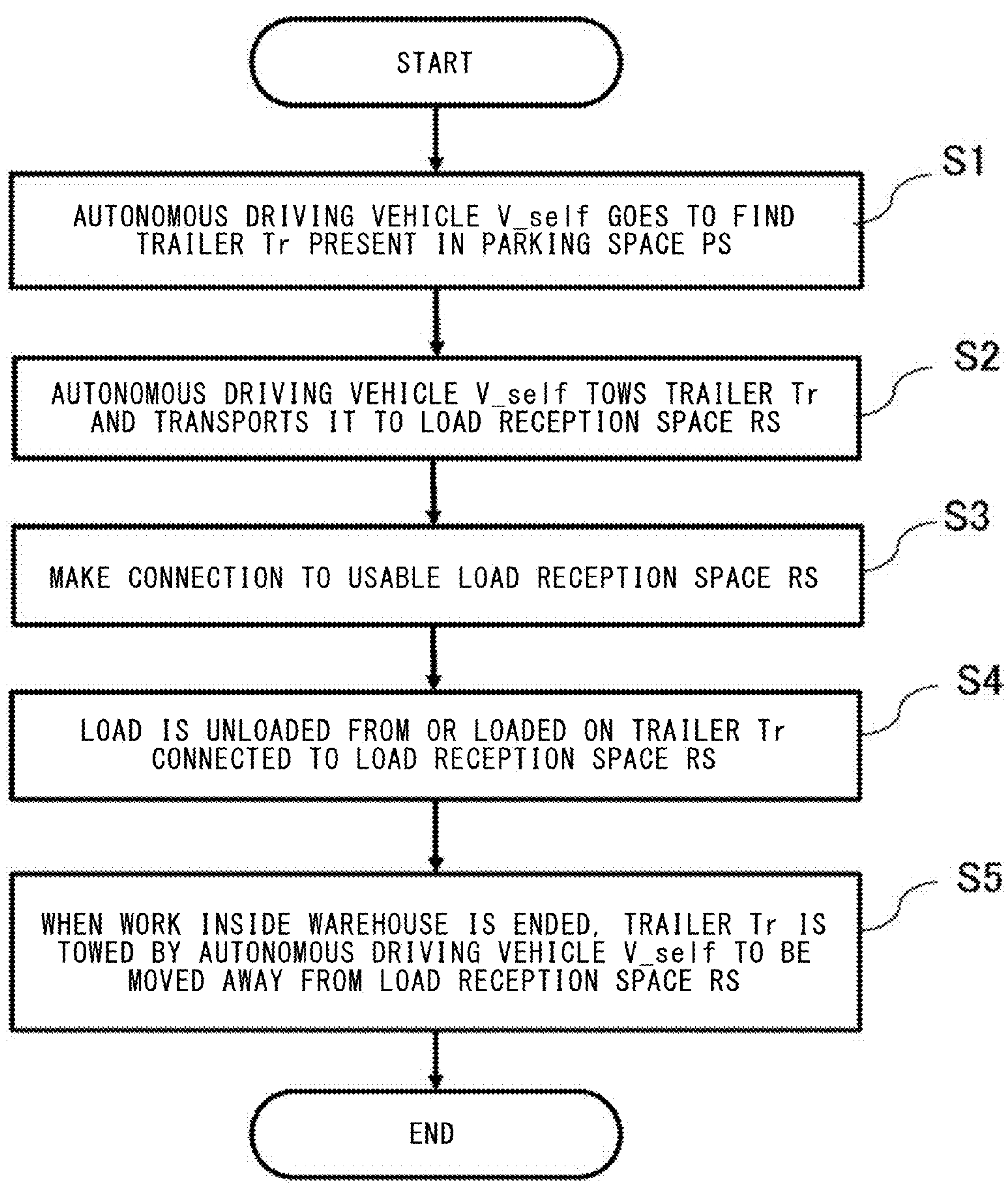
FIG. 3 is a flowchart for explaining the operation of the autonomous driving vehicle in the physical distribution center which is the application example of the autonomous driving assistance system.

FIG. 2 is a diagram for explaining an operation of an autonomous driving vehicle in the physical distribution center which is an application example of the autonomous driving assistance system. FIG. 3 is a flowchart showing the flow of the operation of the autonomous driving vehicle in the physical distribution center. In FIG. 2, autonomous driving is performed for the purpose of automating transportation of loads in a physical distribution center 1.

Firstly, various transportation agents have parked, in a parking space PS in the physical distribution center 1, trailers Tr containing loads.

An autonomous driving vehicle V_self goes to find any of the trailers Tr parked in the parking space PS (step S1). Then, the autonomous driving vehicle V_self tows the trailer Tr containing a load and transports the trailer Tr to any of load reception spaces RS for carrying the load into a physical distribution warehouse 2 (step S2).

Here, a road-side unit RSU is installed in the physical distribution center 1, and a region including the load reception spaces RS is monitored by the road-side unit RSU. By using information acquired by a sensor of the road-side unit RSU, the autonomous driving assistance device 200 detects presence of objects such as a person and an obstacle in each of the load reception spaces RS and determines whether or not the load reception space RS is usable.

The information, obtained through the determination by the autonomous driving assistance system 10, as to whether or not the load reception space is usable is outputted to the autonomous driving vehicle V_self or a traffic controller and used for any purpose. Most commonly, the autonomous driving vehicle V_self selects a load reception space RS from among load reception spaces RS determined, by the autonomous driving assistance system 10, to be usable and moves the trailer Tr to the selected load reception space RS. The trailer Tr moved to the load reception space RS is connected to a loading dock for carrying in the load (step S3).

Inside the physical distribution warehouse 2, the load is unloaded from the trailer Tr connected to the load reception space RS, or a load is loaded thereon (step S4). When the work inside the physical distribution warehouse 2 is completed, the trailer Tr is towed by the autonomous driving vehicle V_self again to be moved away from the load reception space RS (step S5).

The above work is repeated, whereby transportation of loads from the parking space PS to the load reception spaces RS in the physical distribution center 1 is automated. Although description has been given with the physical distribution center being taken as an example, the facility to which the present system is applicable is not limited to the physical distribution center and the present system only has to be used for the purpose of monitoring the situation of load reception spaces by a road-side unit in the same manner and contributing to assistance for an autonomous driving vehicle.

<Configuration of Autonomous Driving Assistance Device 200>

Figure 4:
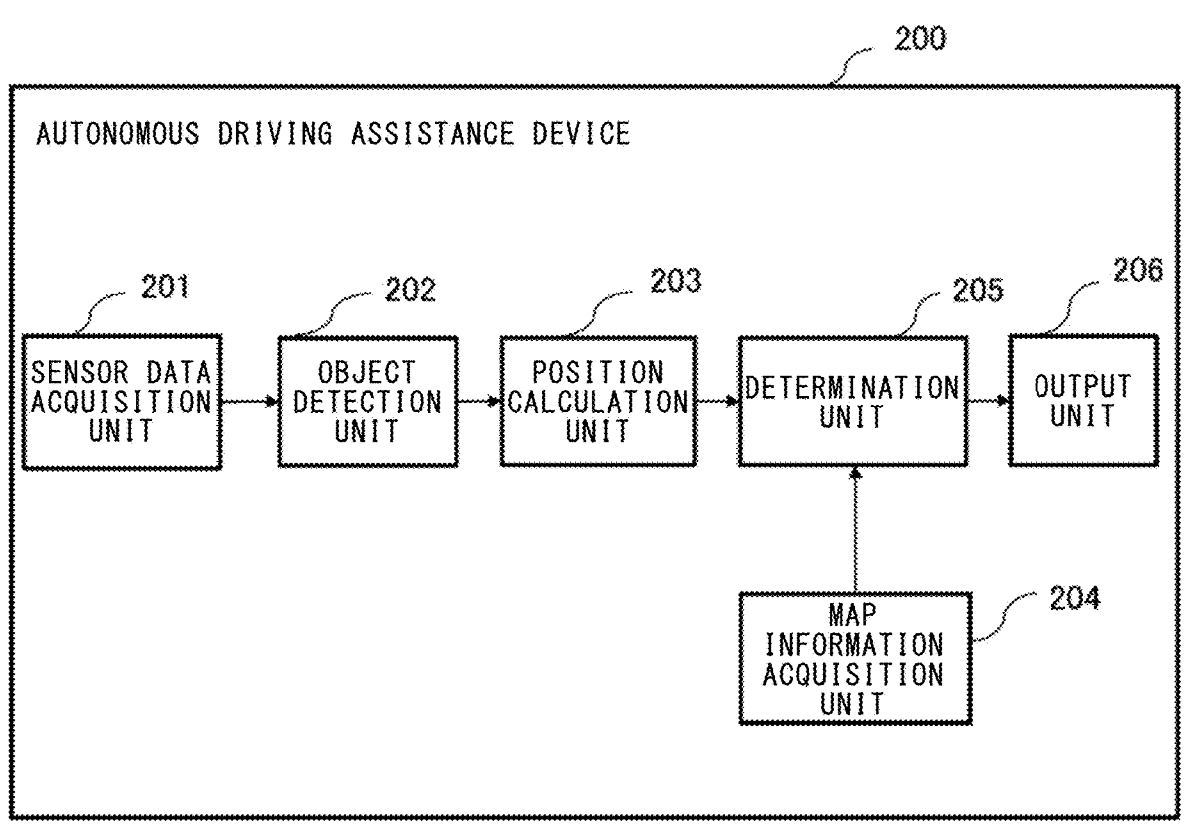
FIG. 4 is a block diagram showing a configuration of an autonomous driving assistance device according to the first embodiment.

Next, a configuration of the autonomous driving assistance device 200 will be described. FIG. 4 is a function block diagram showing a configuration of the autonomous driving assistance device 200 according to the present first embodiment. In FIG. 4, the autonomous driving assistance device 200 includes: a sensor data acquisition unit 201 which acquires sensor data acquired by the sensor device 100; an object detection unit 202 which receives information about the acquired sensor data and detects an object; a position calculation unit 203 which calculates a position of the object detected by the object detection unit 202; a map information acquisition unit 204 which acquires map information about the inside of a target area including a specific area; a determination unit 205 which determines, by using the position of the object obtained from the position calculation unit 203 and the map information obtained from the map information acquisition unit 204, whether or not a load reception space RS is usable; and an output unit 206 which outputs a result of the determination as to the load reception space RS performed by the determination unit 205. Hereinafter, each functional unit will be described.

The sensor data acquisition unit 201 acquires, from the sensor device 100 such as the road-side unit, data acquired by the sensor mounted to the sensor device 100 and transmits the data to the object detection unit 202. In a case where, for example, the sensor mounted to the sensor device 100 is a camera, the sensor data acquisition unit 201 acquires an image. Meanwhile, in a case where, for example, the sensor is a LiDAR sensor, the sensor data acquisition unit 201 acquires a point group. In the sensor device 100, ordinarily, images or point groups are, at intervals of about several Hz to 30 Hz, acquired and transmitted to the sensor data acquisition unit 201 of the autonomous driving assistance device 200 via arbitrarily-selected communication means such as a universal serial bus (USB), a local area network (LAN) cable, or wireless communication.

Figure 5:
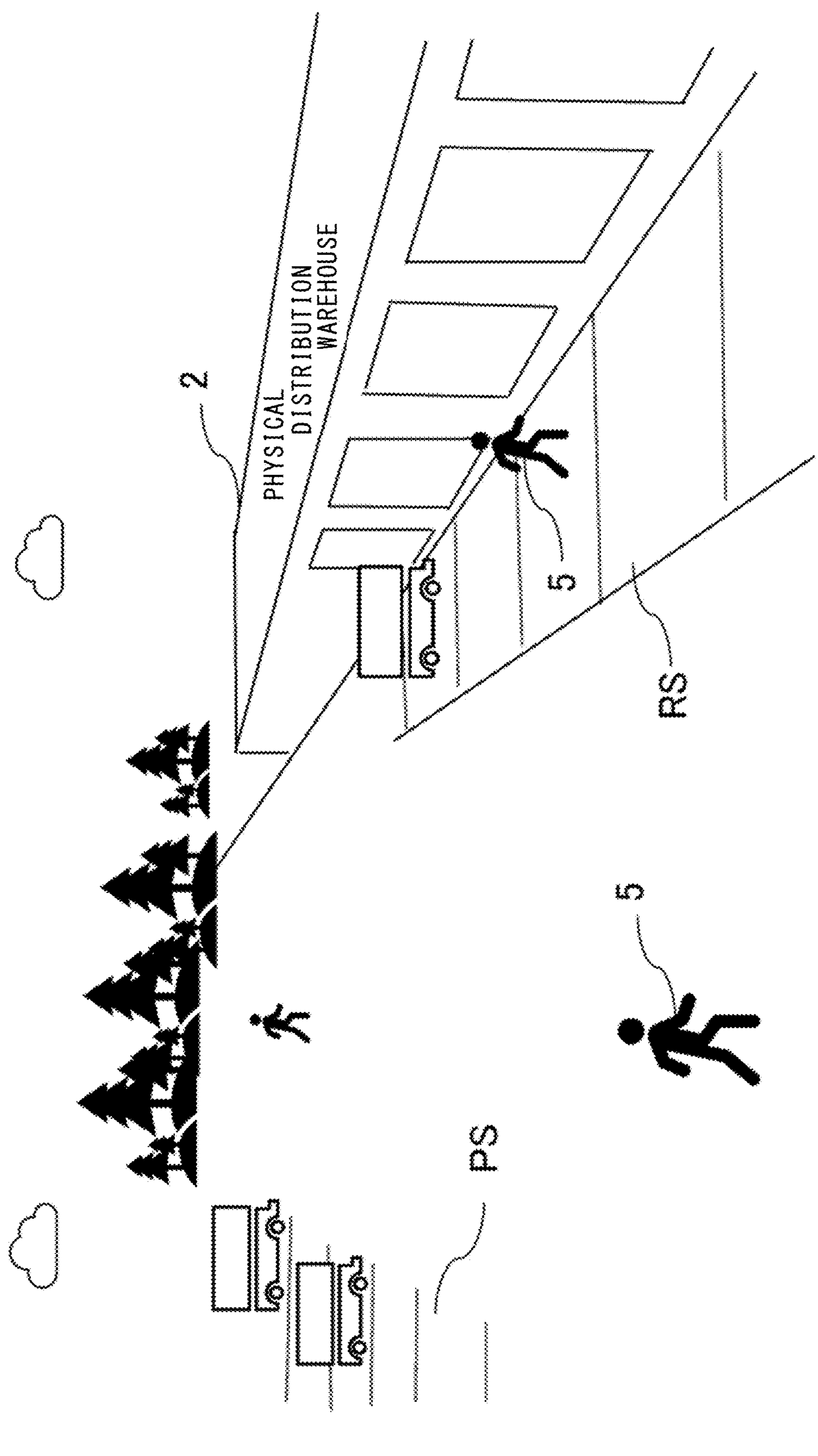
FIG. 5 shows an example of an image acquired from a road-side unit in the physical distribution center which is the application example of the autonomous driving assistance system.

As described above, the sensor mounted to the sensor device 100 may be any sensor such as a camera, a LiDAR sensor, or a millimeter-wave radar as long as the sensor can acquire a position of an object inside the area being monitored by the sensor, and the number of the sensors may be two or more. In the following description, a camera is taken as an example. The road-side unit RSU is installed as the sensor device 100 in the physical distribution center 1, and FIG. 5 shows an example of a camera image acquired from the road-side unit RSU. The road-side unit RSU is ordinarily attached at a height of about several m to 10 m by using a pole or the like.

The object detection unit 202 receives the image from the sensor data acquisition unit 201 and detects an object through a publicly-known technology such as pattern matching or neural networks. In the case of an image, it is general that an object is detected as a 2D bounding box having a rectangular shape and enclosing the object. In addition, in a case where the type of the object (a person, a trailer, a passenger car, or the like) can be determined simultaneously with detection of the 2D bounding box, information about the type may also be simultaneously outputted. Furthermore, in a case where information about the three-dimensional size and orientation of the object can be acquired, the information may also be simultaneously outputted.

Figures 6A, 6B:
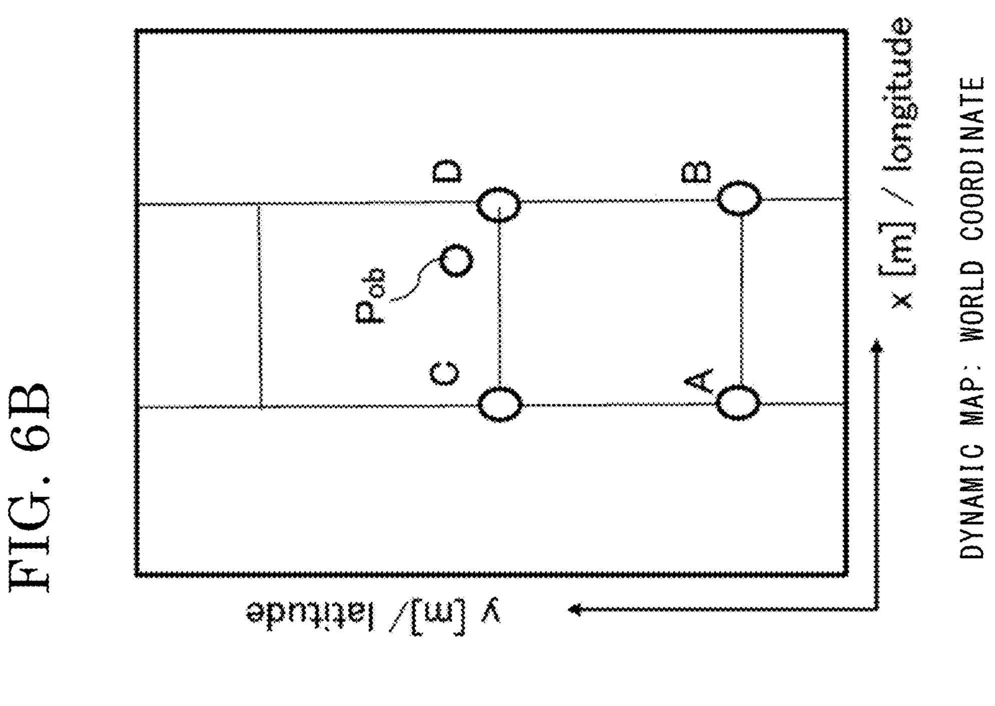
FIGS. 6A and 6B are each a diagram for explaining a method for calculating a position of an object in the image, FIG. 6A showing a position of the object in a camera image, FIG. 6B showing a position of the object on a dynamic map.

The position calculation unit 203 calculates, from the position of the object shown in the image and detected by the object detection unit 202, a position on a world coordinate system through a publicly-known technology. World coordinates are coordinates in the real world. An example of a method for transforming the object position, on an image coordinate system, detected by the camera to a position on a world coordinate system is shown in FIGS. 6A and 6B. FIG. 6A shows a camera image on the image coordinate system, and FIG. 6B shows a dynamic map on the world coordinate system.

It is general that, as shown in FIG. 6A, the image coordinate system is defined with pixel (pix) being used as a unit. Furthermore, it is general that, as shown in FIG. 6A, the image coordinate system has: an origin at the upper left of the image; an x axis with the positive direction thereof being the rightward direction; and a y axis with the positive direction thereof being the downward direction. Meanwhile, it is general that, as shown in FIG. 6B, the world coordinate system is defined as a coordinate system with meter being used as a unit. Furthermore, it is general that, as shown in FIG. 6B, the world coordinate system has: an x axis defined as longitude; a y axis defined as latitude; and a z axis defined as height. Alternatively, the world coordinate system has: an origin at an appropriate position; an x axis with the positive direction thereof being the direction to the east; a y axis with the positive direction thereof being the direction to the north; and a z axis with the positive direction thereof being the height direction. Here, the camera of the road-side unit RSU is fixed. Considering this, a transformation formula between image coordinates and real-world coordinates is created in advance, whereby transformation can be performed therebetween as long as the height in the real world is on the same plane. For example, in a case where a set of four points (a, b, c, and d) defined by pixel coordinates in the image and a set of four points (A, B, C, and D) corresponding thereto and defined by world coordinates are present as points on the ground (height=0), a homography matrix M for transforming image coordinates to world coordinates can be obtained.

After the homography matrix M is obtained, an arbitrarily-selected place (e.g., a circle at the center of the lower end) of the 2D bounding box detected in the image is defined as an object position pob in the image, and the position on the image coordinate system is multiplied by M, whereby an object position Pob on the world coordinate system can be obtained. In addition to this method, a method for performing transformation between image coordinates and world coordinates by using a camera external parameter matrix is also known.

In addition, in a case where a LiDAR sensor is used as the sensor mounted to the road-side unit RSU which is the sensor device 100, three-dimensional positional information is directly obtained from a point group, whereby a position on the world coordinate system can be more easily calculated.

Next, the map information acquisition unit 204 acquires map information about the inside of the target area. The map information is for associating the object position calculated by the position calculation unit 203 and the position of a load reception space RS with each other. Therefore, the only necessary information to be ascertained is the position, of each of the load reception spaces RS, on the world coordinate system, and a system of units, a format, and the like are arbitrarily set.

Next, the determination unit 205 determines, by using the positional information calculated by the position calculation unit 203 and the positional information about each of the load reception spaces obtained from the map information acquisition unit 204, whether or not the load reception space is usable. The determination as to whether or not the load reception space is usable may be performed through any method, and an example of the determination will be described with reference to FIGS. 7A and 7B.

Figures 7A, 7B:
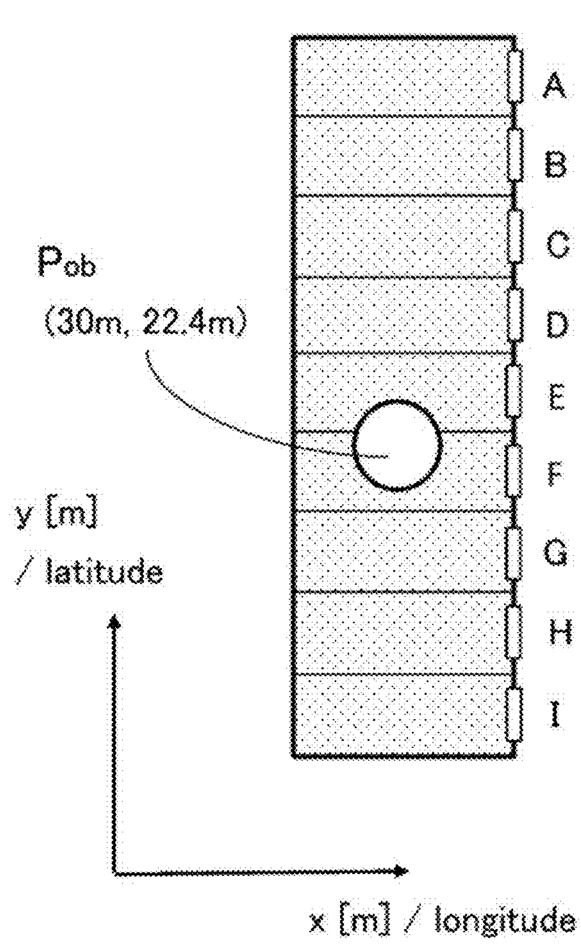
FIGS. 7A and 7B are each a diagram for explaining determination as to whether or not a load reception space is usable, FIG. 7A showing the position of the object in any of load reception spaces, FIG. 7B showing a result of determination regarding each of the load reception spaces as to whether or not the load reception space is usable.

For example, it is assumed that, in FIG. 5, the object detection unit 202 has detected an object 5 in any of the load reception spaces RS. As shown in FIG. 7A, the object position Pob on the world coordinate system calculated by the position calculation unit 203 is present near the boundary between load reception spaces RS, i.e., a load reception space E and a load reception space F. Here, in this example, the center coordinates of the object position Pob relative to the preset origin are (30 m, 22.4 m). Thus, a method in which a load reception space RS present in a region having a radius of 5 m around the object position Pob is determined to be unusable is conceivable.

Lastly, the output unit 206 outputs the information as to whether or not the load reception space is usable. The manner of the outputting is arbitrarily determined, and, for each of the regions of the load reception spaces, the result of the determination as to whether or not the region is usable is outputted as shown in FIG. 7B. The manner of the outputting only has to be such that each of the load reception spaces and whether or not the load reception space is usable are thus ascertained. In addition, the cycle of the outputting is also arbitrarily determined and may be, for example, once per second. The manner in which the information outputted from the output unit 206 is used in a subsequent stage is also arbitrarily determined, and the manner of use may not only be such that the autonomous driving vehicle is controlled so as not to use a load reception space determined to be unusable in this process, but also be such that the information is outputted to a traffic control screen, and an administrator checks the result.

<Operation of Autonomous Driving Assistance Device 200>

Figure 8:
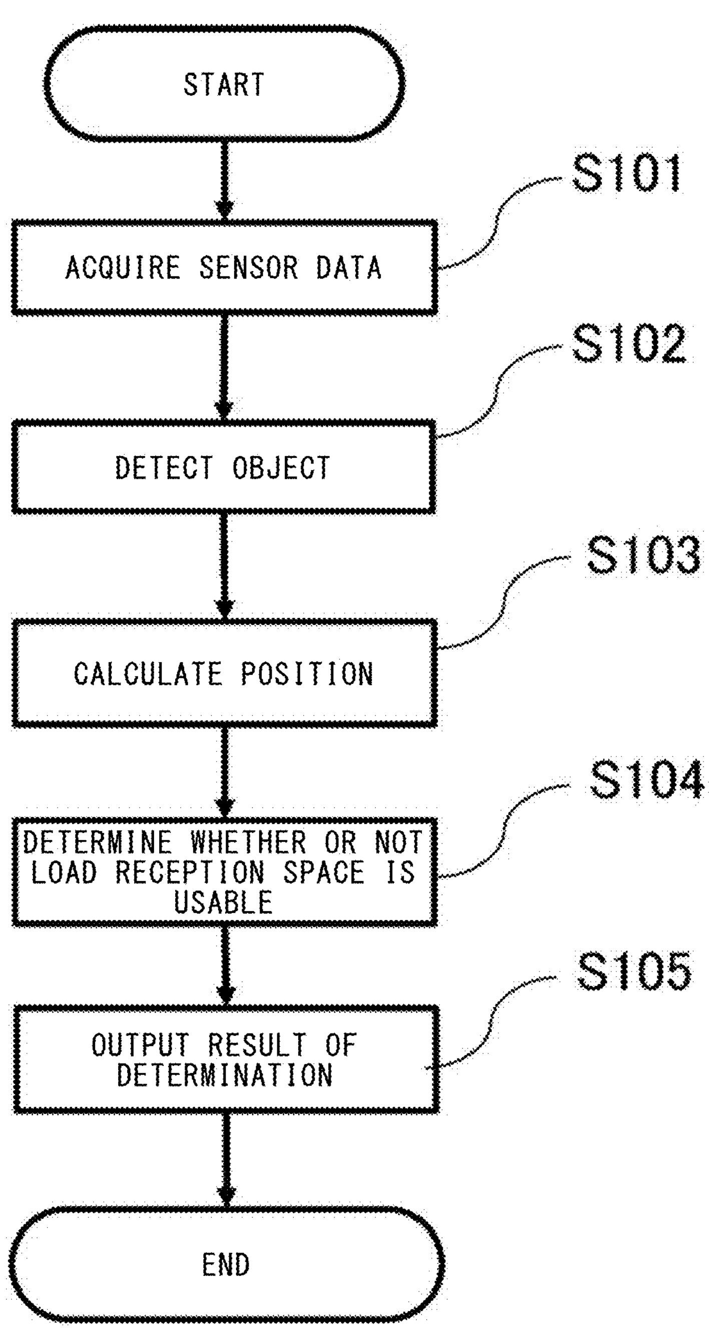
FIG. 8 is a flowchart showing an operation procedure of performing determination as to whether or not the load reception space is usable, in the autonomous driving assistance device according to the first embodiment.

Next, an operation flow of the autonomous driving assistance device 200 will be described. FIG. 8 is a flowchart showing an operation flow of the autonomous driving assistance device 200 according to the first embodiment.

First, in step S101, the sensor data acquisition unit 201 acquires information acquired inside the monitoring area by the sensor mounted to the road-side unit RSU.

Next, in step S102, the object detection unit 202 receives the sensor data acquired in step S101 and detects an object inside the monitoring area.

Next, in step S103, the position calculation unit 203 calculates positional information about the object detected in step S102.

Next, in step S104, the determination unit 205 compares the positional information about the object calculated in step S103 and the positional information about each of the load reception spaces RS acquired from the map information acquisition unit 204, and determines whether or not the load reception space is usable.

Lastly, in step S105, the output unit 206 outputs information about each of the load reception spaces RS as to whether or not the load reception space RS is usable, the information having been obtained through the determination in step S104.

The process from step S101 to step S105 is repeatedly executed, whereby the information about each of the load reception spaces RS as to whether or not the load reception space RS is usable is updated.

As described above, the autonomous driving assistance device according to the first embodiment is an autonomous driving assistance device for determining whether or not a load reception space which is a specific area is usable, the autonomous driving assistance device including: an object detection unit which detects an object from sensor data acquired by a sensor device which monitors a target area including the load reception space; a position calculation unit which calculates a position, in the real world, of the object detected by the object detection unit; a map information acquisition unit which acquires a position, in the real world, of the specific area; a determination unit which determines, by using the position of the object calculated by the position calculation unit and the position of the specific area acquired from the map information acquisition unit, whether or not the specific area is usable; and an output unit which outputs a result, of the determination performed by the determination unit, indicating whether or not the specific area is usable. In addition, the autonomous driving assistance system according to the first embodiment includes: the autonomous driving assistance device according to the first embodiment; and the sensor device which monitors the target area. This configuration makes it possible to easily determine, regarding each of load reception spaces, whether or not the load reception space is usable. Therefore, this configuration enables an autonomous driving vehicle, which has received the result about each of the specific areas as to whether or not the specific area is usable, to efficiently move to a usable one of the load reception spaces.

In addition, the sensor device which monitors the target area is the sensor provided to the road-side unit, and thus information about an object in each of the specific areas can be easily collected.

In a case where the autonomous driving assistance device and the autonomous driving assistance system according to the present first embodiment are not used, the autonomous driving vehicle might fail to notice an object inside any of the load reception spaces, resulting in a collision, or the autonomous driving vehicle might, immediately before entering the load reception space, notice an object and make a change from the load reception space, resulting in a loss in time. However, these situations can be prevented by applying the autonomous driving assistance device and the autonomous driving assistance system according to the present first embodiment. Therefore, the autonomous driving assistance device and the autonomous driving assistance system according to the present first embodiment can contribute to ensuring safety of the autonomous driving vehicle and improvement of the traveling efficiency of the autonomous driving vehicle.

Second Embodiment

In the present second embodiment, an example will be described in which whether or not a load reception space is usable is determined also in consideration of occlusion by an object.

Figure 9:
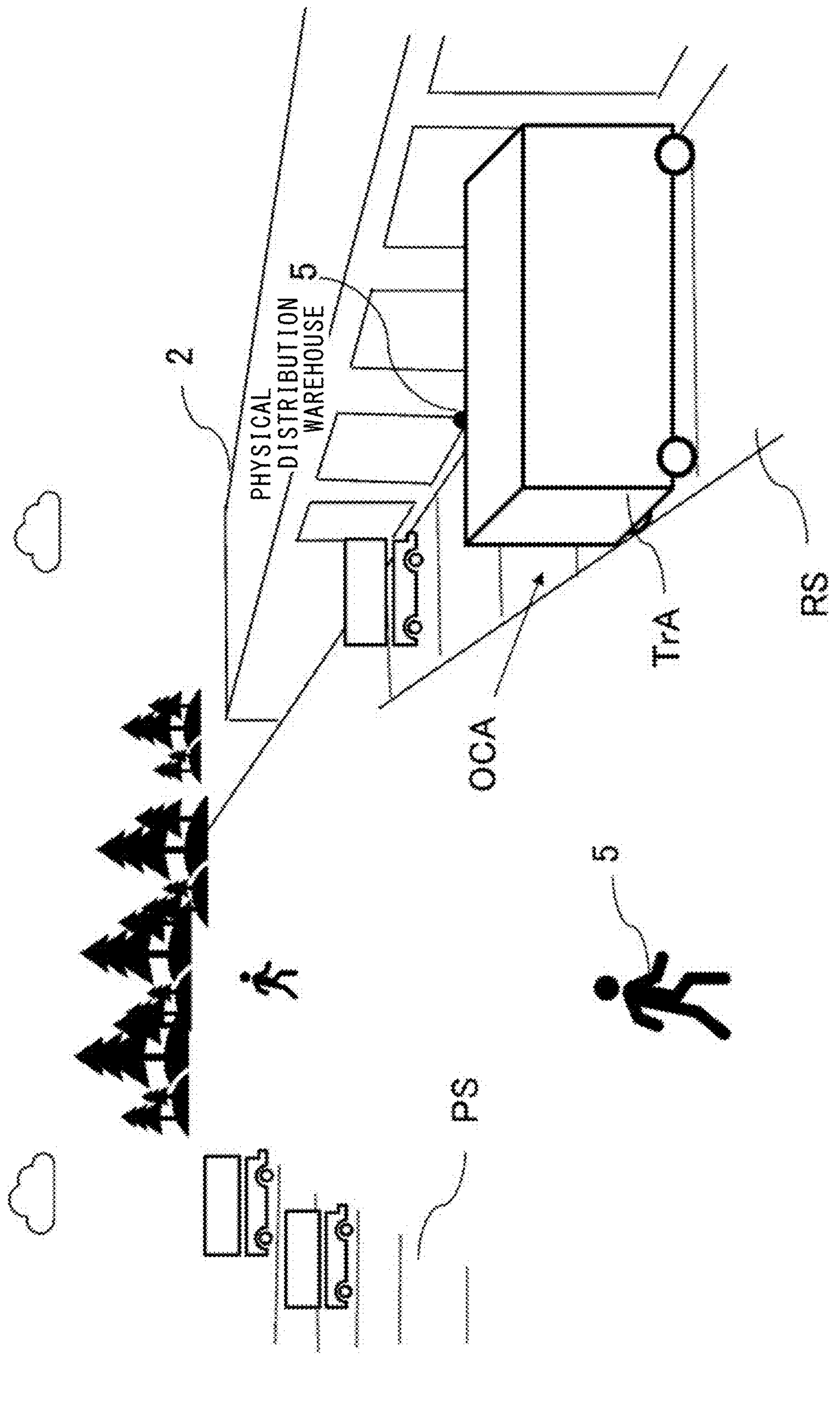
FIG. 9 shows an example of an image acquired from the road-side unit in the physical distribution center which is an application example of an autonomous driving assistance system according to a second embodiment, the example including an occlusion region.

FIG. 9 shows an example of an image acquired from the road-side unit RSU in the physical distribution center 1 which is an application example of an autonomous driving assistance system 10 according to the second embodiment, the example including an occlusion region. Owing to a trailer TrA connected to a load reception space RS, the situation of a load reception space RS on the farther side relative thereto cannot be ascertained from the road-side unit RSU. This region is referred to as an occlusion region OCA. For example, in comparison between FIG. 9 and FIG. 5, it is found that, in FIG. 5, a person as the object 5 in a load reception space RS can be noticed, but, in FIG. 9, the object 5 in the load reception space RS has become difficult to be noticed owing to the trailer TrA.

The trailer Tr used in the physical distribution center 1 or the like is big with a length of about 16 m, a width of about 3 m, and a height of about 5 m, for example. Consequently, a problem arises in that detection in many regions becomes impossible owing to occlusion depending on the position of the road-side unit RSU.

<Configuration of Autonomous Driving Assistance Device 200>

Figure 10:
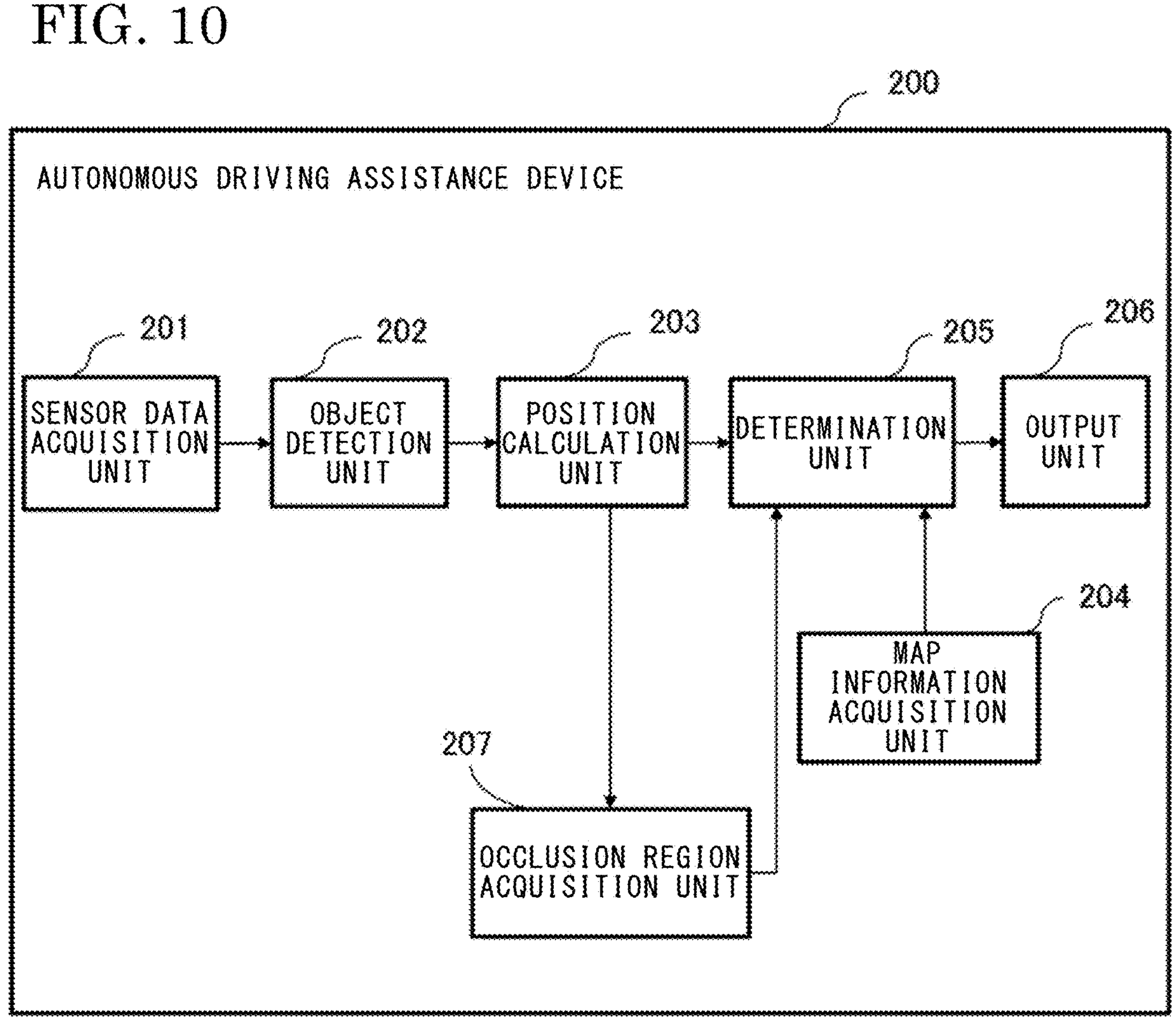
FIG. 10 is a block diagram showing a configuration of an autonomous driving assistance device according to the second embodiment.

FIG. 10 shows a configuration of an autonomous driving assistance device 200 according to the second embodiment. The autonomous driving assistance device 200 according to the second embodiment further includes an occlusion region acquisition unit 207 in addition to the constituents of the autonomous driving assistance device 200 described in the first embodiment.

The occlusion region acquisition unit 207 acquires, for each of target road-side units RSU, region information about a load reception space as an occlusion region (hereinafter, referred to as occlusion space information) according to the position of the object in each of the load reception spaces RS.

Figures 11A, 11B:
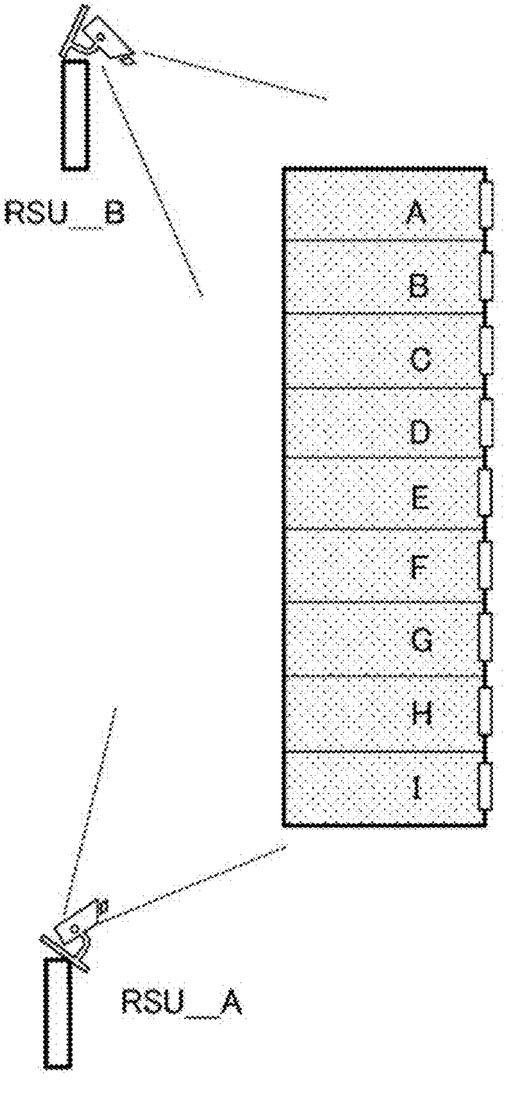
FIGS. 11A and 11B are each a diagram for explaining an example of information about an occlusion space(s) corresponding to each of the load reception spaces, FIG. 11A showing the positions of the load reception spaces and road-side units, FIG. 11B showing, for each of the road-side units, occlusion spaces each occluded when an object is present in a corresponding one of the load reception spaces.

FIGS. 11A and 11B each show an example of the occlusion space information. Out of FIGS. 11A and 11B, FIG. 11A shows the positions of the load reception spaces and road-side units, and FIG. 11B shows, for each of the road-side units, occlusion spaces each occluded when an object is present in a corresponding one of the load reception spaces. Occlusion spaces A each indicate an occlusion space that is, as seen from a road-side unit RSU A, occluded when an object is present in the corresponding load reception space. In this example, two road-side units RSU A and RSU B are installed on both ends relative to the load reception spaces RS so as to view the load reception spaces RS from the load reception space I side and the load reception space A side, respectively. Here, description will be given by taking, as an example, a case where an object is present in a load reception space No. E.

In a case where the trailer Tr is connected to the load reception space E, load reception spaces D and C are occluded as seen from the road-side unit RSU A. The load reception spaces D and C are adjacent to the load reception space E and are in a direction away from the road-side unit RSU A beyond the load reception space E. Likewise, load reception spaces F and G are occluded as seen from the road-side unit RSU B. The load reception spaces F and G are adjacent to the load reception space E and are in a direction away from the road-side unit RSU B beyond the load reception space E.

Although a case where the relationship between each load reception space RS to which the trailer Tr is connected and the corresponding load reception space(s) RS occluded at the time of the connection is provided as prior information has been described as an example here, the relationship does not necessarily have to be calculated in advance. The size of a detected object may be presumed from information about the position and the posture of each of the road-side units RSU, and regions to be occluded may be calculated in real time according to the position of the object. In addition, in a case where information about the attribute of the object is also obtained from the object detection unit 202, the result of presuming the size of the object may be changed according to the attribute. Furthermore, in a case where information about the size and orientation of the object is obtained from the object detection unit 202, the information may be used. In the physical distribution center 1, the sizes of trailers Tr are often approximately equal to one another. Thus, as described above, occlusion regions may be calculated with the sizes of detected objects being presumed to be the same size.

Next, the determination unit 205 of the autonomous driving assistance device 200 according to the present second embodiment determines whether or not a load reception space is usable, not only according to the position of the object as described in the first embodiment but also in consideration of the occlusion space information. Here, each of the occlusion regions may be determined to be unusable, or the output unit 206 may directly output the occlusion space information without using the occlusion space information by the determination unit 205. A configuration may be employed in which the manner of use of the outputted result is determined on the vehicle side or the traffic controller side on which the outputted result has been received.

<Operation of Autonomous Driving Assistance Device 200>

Figure 12:
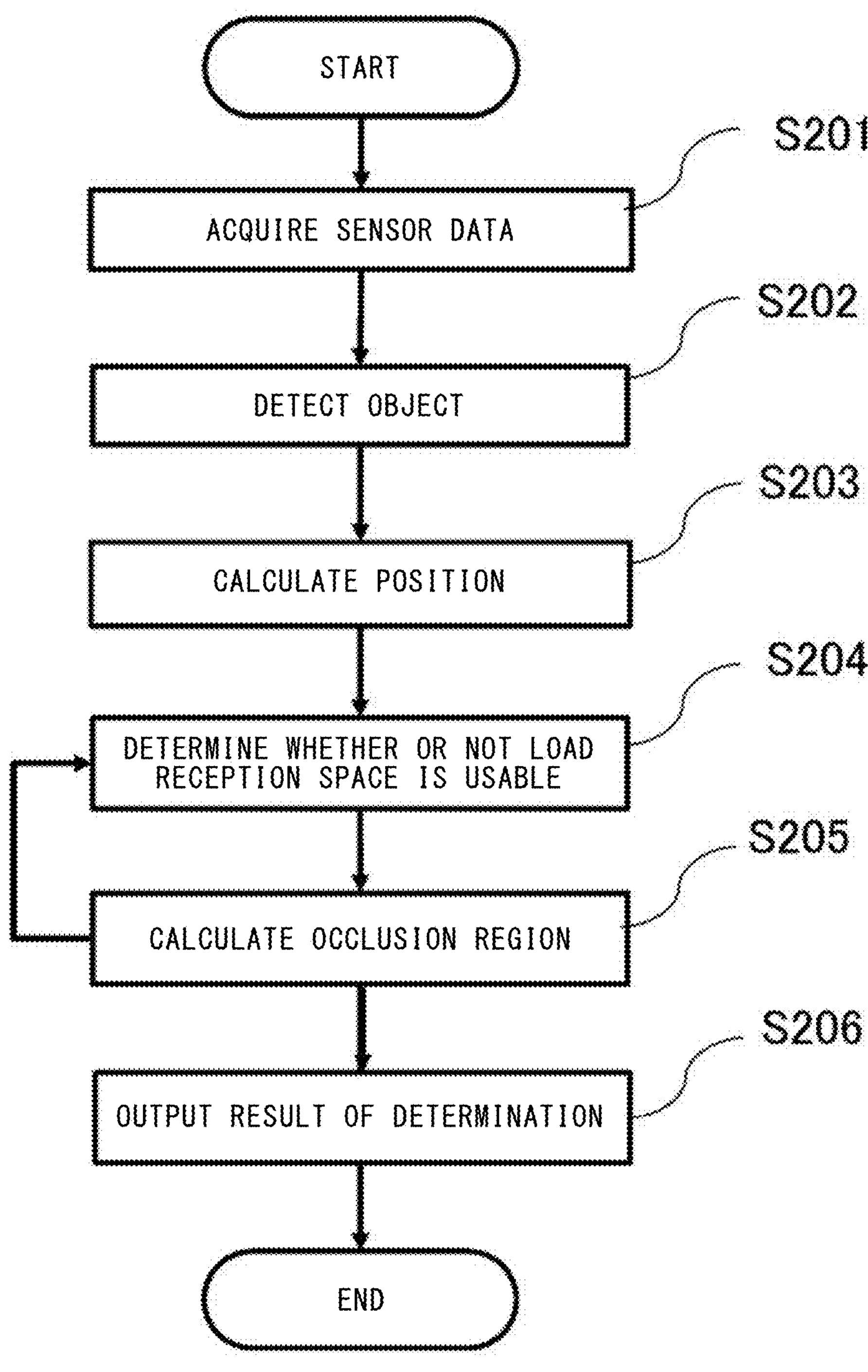
FIG. 12 is a flowchart showing an operation procedure of the autonomous driving assistance device according to the second embodiment.

Next, an operation flow of the autonomous driving assistance device 200 will be described. FIG. 12 is a flowchart showing the operation flow of the autonomous driving assistance device 200 according to the second embodiment. The process from step S201 to step S204 is the same as the process from step S101 to step S104 in the first embodiment and will not be described. In the present second embodiment, a step of calculating occlusion regions is added subsequently to step S204.

After the determination unit 205 determines in step S204, regarding each of the load reception spaces, whether or not the load reception space is usable, occlusion regions are calculated in step S205 by using the information acquired from the occlusion region acquisition unit 207. Here, the occlusion space information calculated in step S205 is inputted in step S204 to be used for determination, as to whether or not the load reception space is usable, in the next and subsequent cycles. There may be a case where a new trailer TrB is connected on the road-side unit RSU side relative to the trailer TrA already connected to the corresponding load reception space RS, so that the trailer TrA becomes unable to be detected from the road-side unit RSU owing to occlusion. In this case, the object information about the trailer TrA is lost. Consequently, even though the trailer TrA continues to be in the connected state, the corresponding load reception space might be determined to be usable. Said input of the occlusion space information in step S204 is intended to prevent this erroneous determination. That is, in a case where a trailer Tr having been already connected is present in an occlusion region, the load reception space RS to which the trailer Tr has been connected is kept regarded as being unusable until the road-side unit RSU detects that the trailer Tr has moved away from this load reception space RS.

In step S206, the output unit 206 outputs the information, about each of the load reception spaces RS as to whether or not the load reception space RS is usable, obtained through the determination in step S204. At this time, the result of determination as to whether or not the load reception space is usable may be outputted with the occlusion space information being regarded as unusable. Alternatively, the result of determination indicating that the determination unit 205 does not use the occlusion space information may be outputted from the output unit 206, and the occlusion space information may be outputted together.

The process from step S201 to step S206 is repeatedly executed, whereby the information about each of the load reception spaces RS as to whether or not the load reception space RS is usable is updated together with the occlusion space information.

As described above, in the second embodiment, the autonomous driving assistance device further includes an occlusion region acquisition unit which acquires, by using the position of the object calculated by the position calculation unit, a region that is occluded by the object. Consequently, determination as to whether or not the load reception space is usable can be performed also in consideration of occlusion due to the object.

Third Embodiment

The present third embodiment provides an autonomous driving assistance device and an autonomous driving assistance system in which, in consideration of the fact that occlusion occurs when a trailer is connected to a load reception space, a load reception space that could be least likely to involve occlusion is preferentially reported to a subsequent stage.

<Configuration of Autonomous Driving Assistance Device 200>

Figure 13:
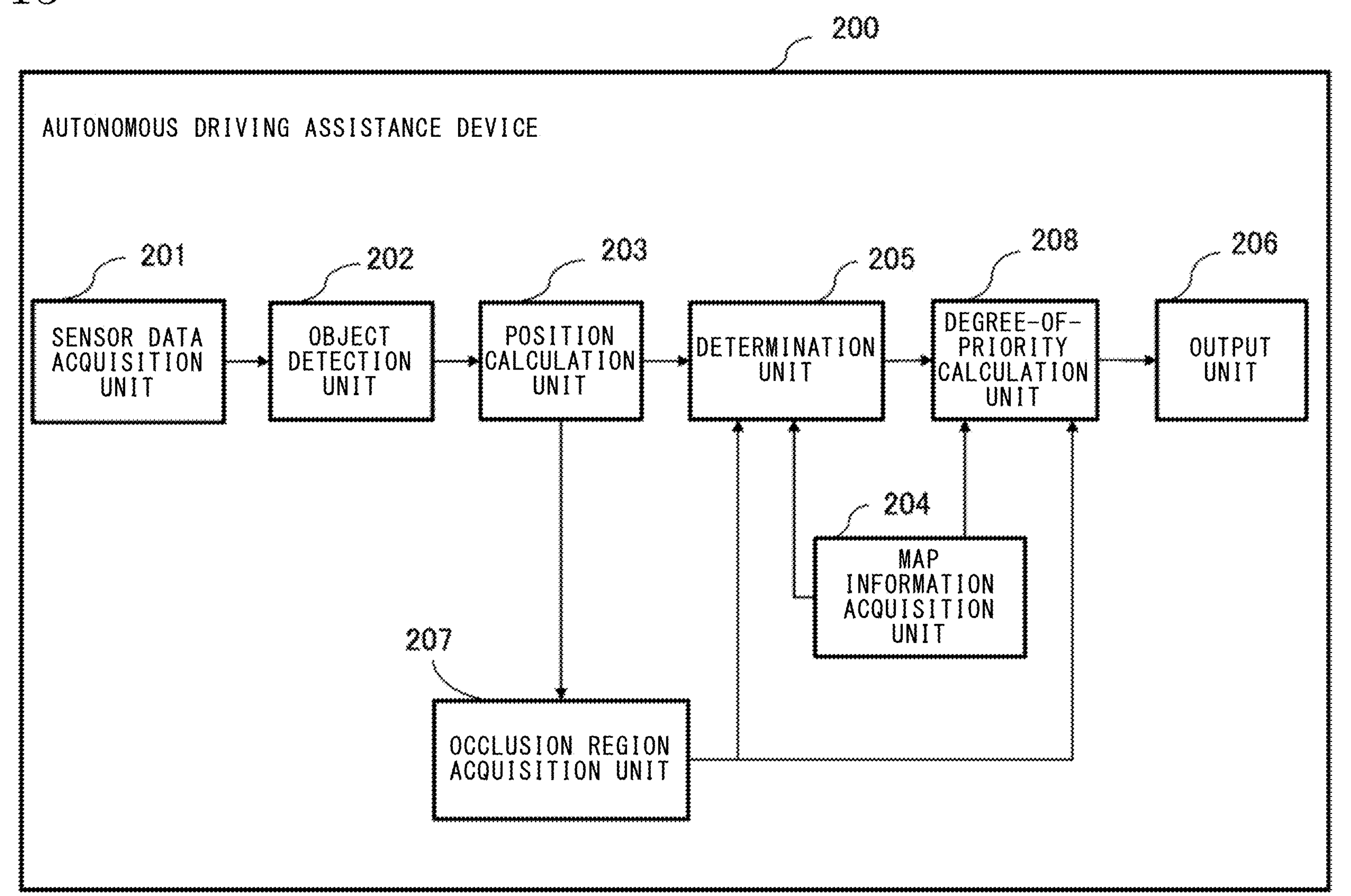
FIG. 13 is a block diagram showing a configuration of an autonomous driving assistance device according to a third embodiment.

FIG. 13 shows a configuration of an autonomous driving assistance device 200 according to the third embodiment. This configuration is a configuration in which a degree-of-priority calculation unit 208 is further provided in addition to the constituents of the second embodiment.

The degree-of-priority calculation unit 208 adds, in consideration of occlusion, a degree of priority to a load reception space determined, by the determination unit 205, to be usable and outputs the resultant information. As shown in FIGS. 11A and 11B, each of the load reception spaces and the corresponding occlusion region(s) occluded when a trailer is connected to the space can be estimated. Thus, by utilizing this estimation, the degree of priority for the load reception space to be used next is determined.

An example of a method for calculating a degree of priority will be described with reference to FIGS. 11A and 11B. With only the road-side unit RSU A being considered in FIGS. 11A and 11B, the following problem arises. That is, when the trailer Tr is connected to any of the load reception spaces No. C to No. F, the number of regions occluded through said connection is two, and thus the number of load reception spaces that can be determined to be usable is smaller while the trailer Tr is connected to any of the load reception spaces No. C to No. F. Against this problem, the degree-of-priority calculation unit 208 calculates a degree of priority for each of the load reception spaces according to the area of the region occluded when the load reception space is used. Specifically, for the road-side unit RSU A, the load reception space A regarding which no load reception space is occluded is set to have the highest degree of priority, and the load reception spaces C to F regarding each of which two load reception spaces are occluded are each set to have the lowest degree of priority, whereby degrees of priority can be calculated.

In a case where a plurality of the road-side units are present, setting only has to be made such that, in consideration of regions to be occluded as seen from each of the road-side units, a load reception space regarding which the number of the occlusion regions is smaller has a higher degree of priority.

Next, the output unit 206 according to the present third embodiment outputs information, as to whether or not the load reception space is usable, that includes the information about the corresponding degree of priority outputted from the degree-of-priority calculation unit 208. It is also possible to arbitrarily determine the manner in which the information, as to whether or not the load reception space is usable, that includes the information about the corresponding degree of priority is used on the subsequent-stage vehicle side or traffic controller side on which said information is received. For example, the following manner of use is also assumed. That is, degrees of priority that are in the top 50% of all the degrees of priority are used for vehicle control without being particularly distinguished.

<Operation of Autonomous Driving Assistance Device 200>

Figure 14:
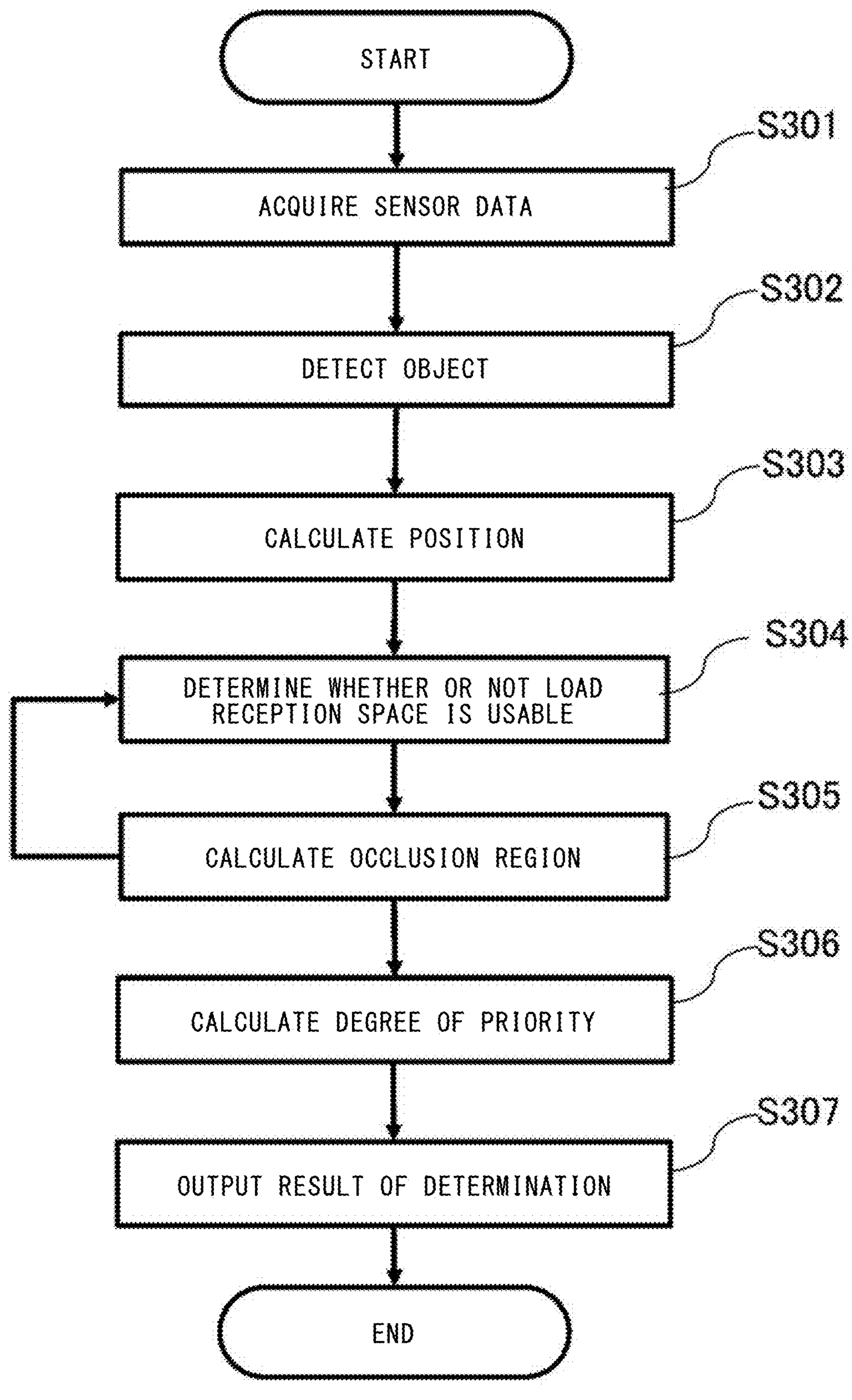
FIG. 14 is a flowchart showing an operation procedure of the autonomous driving assistance device according to the third embodiment.

Next, an operation flow of the autonomous driving assistance device 200 will be described. FIG. 14 is a flowchart showing the operation flow of the autonomous driving assistance device 200 according to the third embodiment. The process from step S301 to step S305 is the same as the process from step S201 to step S205 in the second embodiment and will not be described. In the present third embodiment, a step of calculating degrees of priority is added subsequently to step S305.

After the occlusion regions are calculated in step S305, the degree-of-priority calculation unit 208 calculates, in step S306, degrees of priority for the load reception spaces determined, in steps S304 and S305, to be usable.

Lastly, in step S307, the output unit 206 outputs: the information, about each of the load reception spaces RS as to whether or not the load reception space RS is usable, obtained through the determination in steps S304 and S305; the occlusion space information calculated in step S305; and the degrees of priority for the load reception spaces calculated in step S306.

The process from step S301 to step S307 is repeatedly executed, whereby the information about each of the load reception spaces RS as to whether or not the load reception space RS is usable, the occlusion space information, and the degrees of priority for the load reception spaces are updated.

As described above, in the third embodiment, the autonomous driving assistance device further includes a degree-of-priority calculation unit which calculates a degree of priority for a specific area determined, by the determination unit, to be usable. Consequently, it is possible to output information which includes the degree of priority for the load reception space and in which occlusion due to another vehicle that enters and leaves the specific area has been reflected.

Fourth Embodiment

A fourth embodiment provides an autonomous driving assistance device and an autonomous driving assistance system in which an input is received from a user so that restriction information about a usable one of the load reception spaces can be changed.

Figure 15:
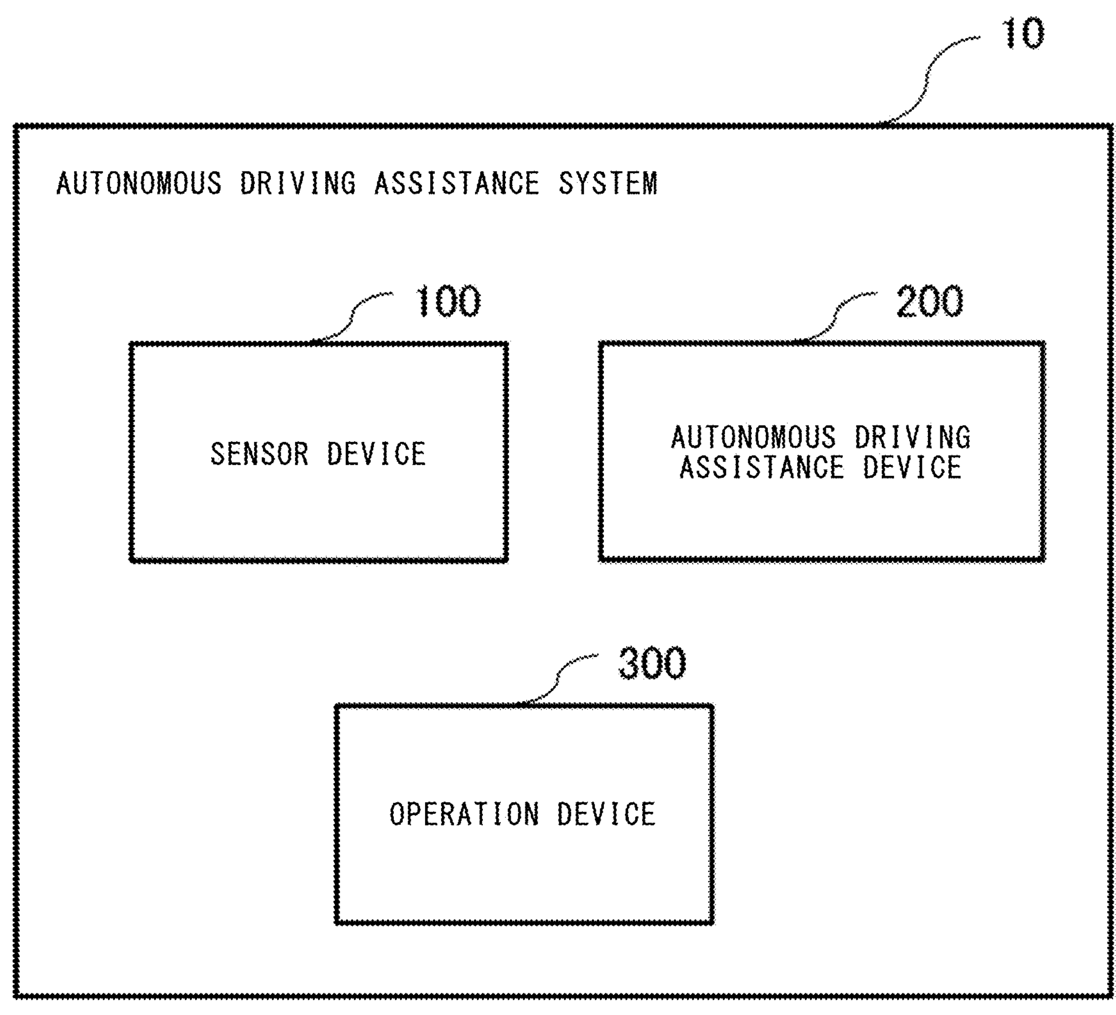
FIG. 15 is a block diagram showing a configuration of an autonomous driving assistance system according to a fourth embodiment.

FIG. 15 shows a configuration of an autonomous driving assistance system 10 according to the fourth embodiment. In the present fourth embodiment, the autonomous driving assistance system 10 further includes, in addition to the constituents shown in FIG. 1, an operation device 300 which receives an input from a user via a user interface, communication with the outside, or the like.

<Configuration of Autonomous Driving Assistance Device 200>

Figure 16:
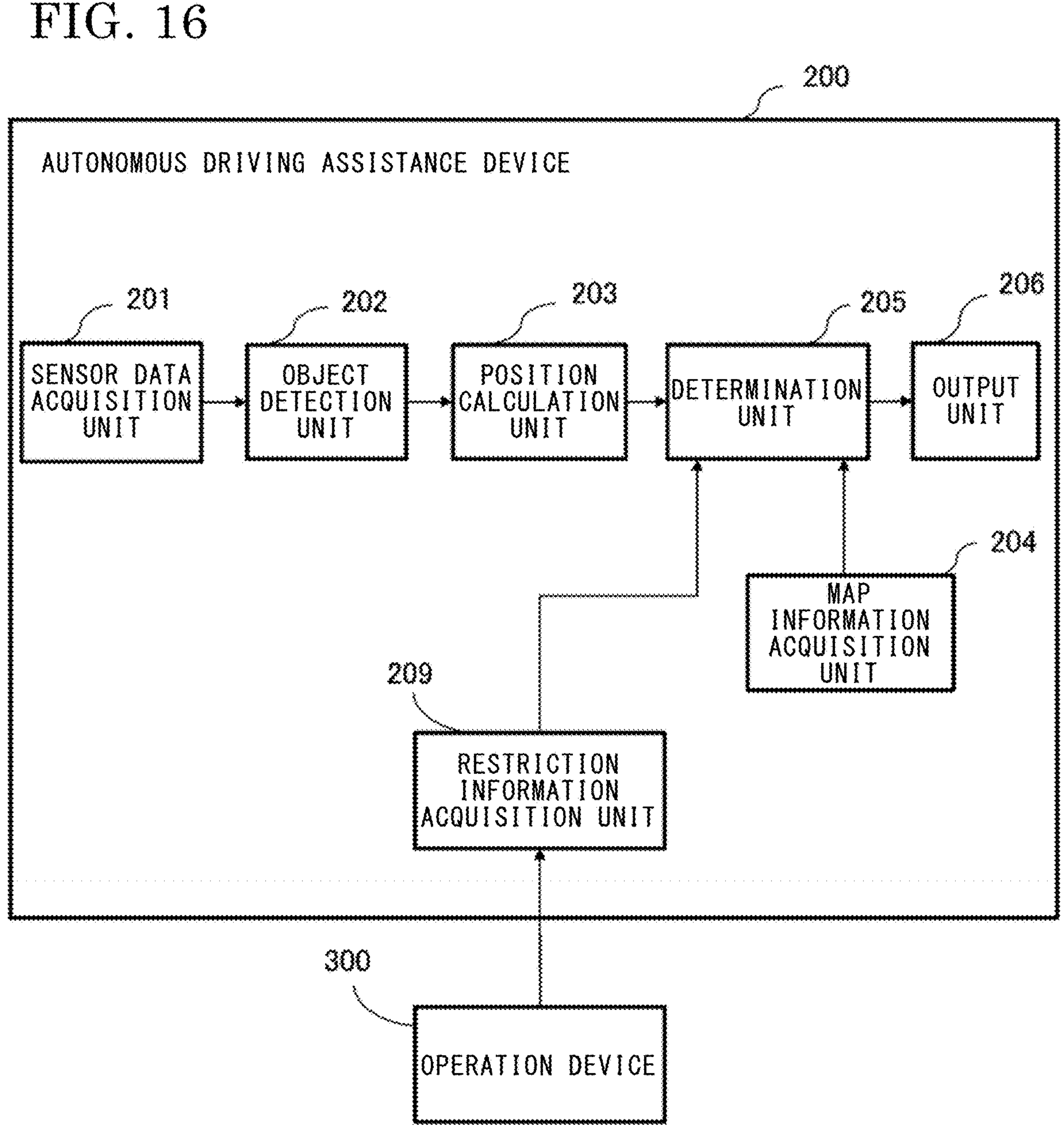
FIG. 16 is a block diagram showing a configuration of an autonomous driving assistance device according to the fourth embodiment.

FIG. 16 shows a configuration of an autonomous driving assistance device 200 according to the fourth embodiment. In FIG. 16, the autonomous driving assistance device 200 includes a restriction information acquisition unit 209 which acquires restriction information about a load reception space through inputting from the operation device 300.

The restriction information acquisition unit 209 acquires, via the operation device 300, restriction information as to whether or not a load reception space is usable, such as restriction information indicating that "a load reception space No. X is temporarily unusable" or restriction information indicating that "a trailer for company Y has to be connected to a load reception space No. Y". The acquired restriction information is used, by the determination unit 205, to determine whether or not the load reception space is usable.

The simplest determination example is as follows. That is, a load reception space regarded, in the restriction information acquisition unit 209, as being unusable is determined, by the determination unit 205 as well, to be unusable, and the result of the determination is outputted from the output unit 206.

<Operation of Autonomous Driving Assistance Device 200>

Next, an operation flow of the autonomous driving assistance device 200 will be described. The operation flow of the autonomous driving assistance device 200 according to the present fourth embodiment is the same as that in the flowchart shown in FIG. 8 regarding the first embodiment, but the restriction information acquired from the restriction information acquisition unit 209 is also used for determination in step S104 as to whether or not the load reception space is usable. The other features of the operation flow will not be described.

The process from step S101 to step S105 is repeatedly executed, whereby the information about each of the load reception spaces RS as to whether or not the load reception space RS is usable is updated. Furthermore, when the restriction condition is updated through the operation device 300, it is possible to output information, about each of the load reception spaces RS as to whether or not the load reception space RS is usable, in which the condition has been reflected.

As described above, in the fourth embodiment, the autonomous driving assistance system further includes an operation device through which information is inputted from a user, and the autonomous driving assistance device further includes a restriction information acquisition unit which acquires restriction information as to whether or not the specific area is usable. Consequently, detailed information as to whether or not the load reception space RS is usable can be outputted.

Although description has been given above with a configuration example in which the restriction information acquisition unit 209 which acquires restriction information from the operation device 300 is provided in addition to the constituents of the autonomous driving assistance device 200 according to the first embodiment, it is needless to say that the restriction information acquisition unit 209 may be provided in addition to the constituents of either of the autonomous driving assistance devices 200 according to the second and third embodiments.

Fifth Embodiment

A fifth embodiment provides an autonomous driving assistance device and an autonomous driving assistance system in which, at the time of calculation of degrees of priority described in the third embodiment, the degrees of priority can be calculated also in consideration of parameters other than occlusion.

<Configuration of Autonomous Driving Assistance Device 200>

Figure 17:
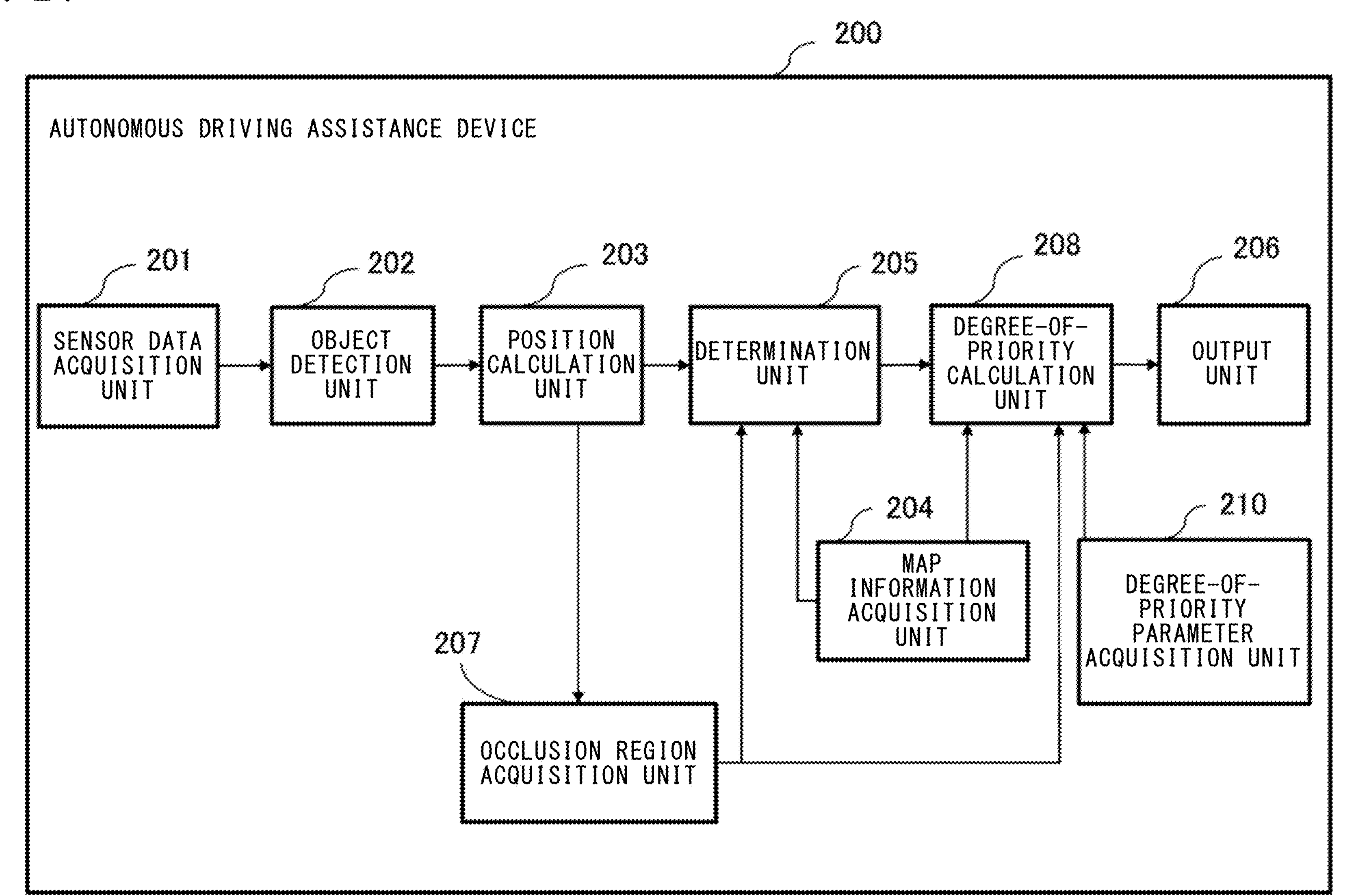
FIG. 17 is a block diagram showing a configuration of an autonomous driving assistance device according to a fifth embodiment.

FIG. 17 shows a configuration of an autonomous driving assistance device 200 according to the fifth embodiment. The autonomous driving assistance device 200 according to the present fifth embodiment further includes a degree-of-priority parameter acquisition unit 210 in addition to the constituents of the autonomous driving assistance device 200 according to the third embodiment.

The degree-of-priority parameter acquisition unit 210 acquires various factors (degree-of-priority parameters) to be considered at the time of determining a load reception space to be used. The factors are ones other than occlusion, such as ease of connection.

Figures 18, 19:
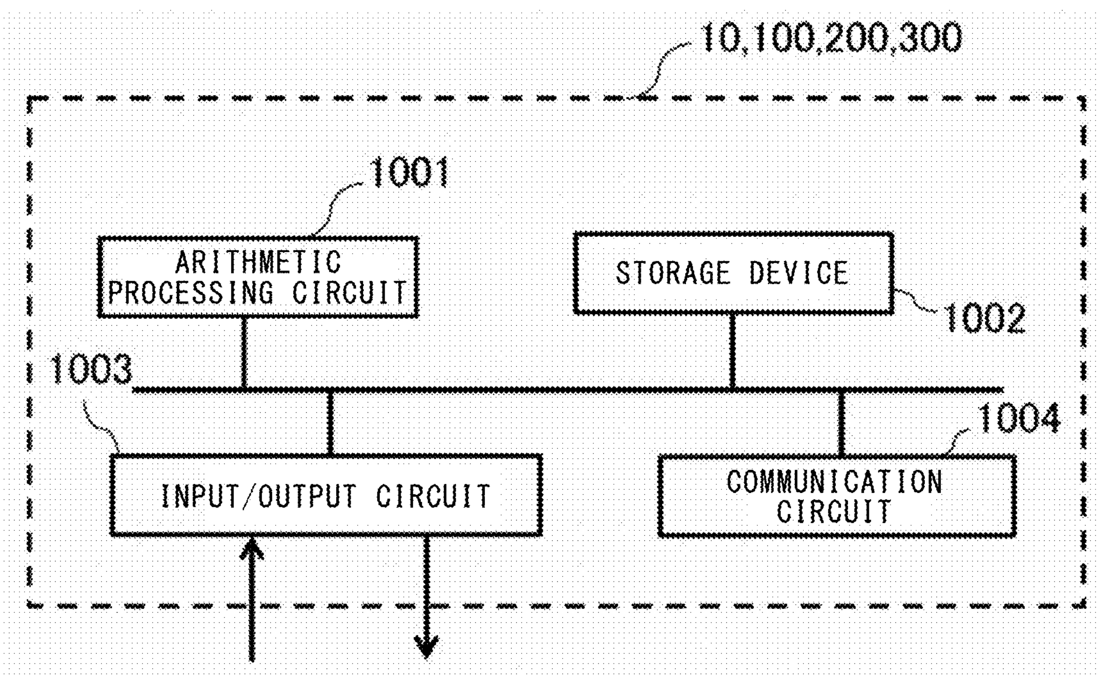
FIG. 18 shows examples of degree-of-priority parameters.
FIG. 19 shows an example of a hardware configuration of each of the autonomous driving assistance devices and the autonomous driving assistance systems according to the first to fifth embodiments.

FIG. 18 shows examples of the degree-of-priority parameters and corresponding weights. Each of the degree-of-priority parameters is a factor that is desirably considered when a load reception space to be connected is selected. The degree-of-priority parameter is stored together with a corresponding weight. For the degree-of-priority parameter, a preset value may be prestored in a storage device 1002 (see FIG. 19) and may be acquired from the storage device 1002, or a value set by a user may be acquired from, for example, the operation device 300 shown in FIG. 17. With respect to each of the load reception spaces, a total weight is calculated by using the degree-of-priority parameters and is combined with the corresponding degree of priority calculated as in the third embodiment, and a final degree of priority is outputted.

The degree-of-priority parameters shown in the example in FIG. 18 are "the distance to the load reception space", "presence or absence of a vehicle in an adjacent load reception space", and "necessity to perform drastic turning". Each of the degree-of-priority parameters is a parameter regarding the movement efficiency of the autonomous driving vehicle that travels in the physical distribution center 1 and that moves in the load reception space as a specific area. The degree-of-priority parameter acquisition unit 210 acquires degree-of-priority parameters including at least a parameter regarding a traveling efficiency of an autonomous driving vehicle that travels in the specific area. Furthermore, the degree-of-priority parameter acquisition unit stores therein each of the parameters together with a corresponding weight.

<Operation of Autonomous Driving Assistance Device 200>

Next, an operation flow of the autonomous driving assistance device 200 will be described. The operation flow of the autonomous driving assistance device 200 according to the present fifth embodiment is the same as that in the flowchart shown in FIG. 14 regarding the third embodiment, but, at the time of calculating degrees of priority in step S306, the calculation is performed also in consideration of the degree-of-priority parameters acquired from the degree-of-priority parameter acquisition unit 210. The other features of the operation flow will not be described.

The process from step S301 to step S307 is repeatedly executed, whereby the information about each of the load reception spaces RS as to whether or not the load reception space RS is usable, the occlusion space information, and the degrees of priority for the load reception spaces are updated. The occlusion regions in the third embodiment make it also possible to preset degrees of priority according to the position at which the road-side unit is installed. Meanwhile, the degree-of-priority parameters in the present fifth embodiment lead to calculation of a degree of priority according to each of the load reception spaces determined to be usable, whereby the autonomous driving vehicle having received the outputted result can select a load reception space in consideration of the movement efficiency, a traffic line, and the like.

As described above, in the fifth embodiment, the autonomous driving assistance device further includes a degree-of-priority parameter acquisition unit which acquires degree-of-priority parameters including at least a parameter regarding a movement efficiency of an autonomous driving vehicle that moves in the specific area, and the degree-of-priority calculation unit calculates, by using each of the degree-of-priority parameters and a degree-of-priority weight corresponding to the degree-of-priority parameter, the degree of priority for the specific area determined to be usable. With this configuration, the following advantageous effect can be exhibited in addition to the advantageous effects of the third embodiment. That is, a load reception space can be selected in consideration of not only occlusion but also the movement efficiency, ease of movement, and the like of the autonomous driving vehicle, whereby it is possible to make a greater contribution to making autonomous driving efficient.

It is needless to say that the fourth and fifth embodiments can be combined.

FIG. 19 shows an example of a hardware configuration of each of the autonomous driving assistance systems 10 and the autonomous driving assistance devices 200 according to the first to fifth embodiments. The autonomous driving assistance system 10 and the autonomous driving assistance device 200 include: an arithmetic processing circuit 1001; the storage device 1002 including a read only memory (ROM) in which a program for executing the function of each functional unit is stored and a random access memory (RAM) in which each piece of data regarding an execution result of the corresponding functional unit which is a result of calculation performed with the corresponding program, and each piece of data having been acquired, are saved; an input/output circuit 1003; and a communication circuit 1004.

The arithmetic processing circuit 1001 includes a processor configured with a central processing unit (CPU), and the processor may be implemented by a digital signal processor (DSP) or a logic circuit. Dedicated hardware may be used as the arithmetic processing circuit 1001. In a case where the arithmetic processing circuit 1001 is dedicated hardware, the arithmetic processing circuit 1001 is implemented by, for example, a single circuit, a complex circuit, a programmed processor, a parallel programmed processor, an application specific integrated circuit (ASIC), a field-programmable gate array (FPGA), or a combination thereof.

Data or a signal is transmitted and received, via the communication circuit 1004, between the autonomous driving assistance device 200 and the road-side unit RSU which is the sensor device 100 and between the autonomous driving assistance device 200 and the operation device 300 through which a user performs inputting. An output from the autonomous driving assistance system 10 is also outputted via the communication circuit 1004 to the autonomous driving vehicle or the traffic controller.

The sensor device 100 and the operation device 300 also have similar hardware configurations.

Other Embodiments

Although an example in which information such as the result of the determination regarding each of the load reception spaces RS as to whether or not the load reception space RS is usable is outputted from the autonomous driving assistance system 10 to the autonomous driving vehicle or the traffic controller has been described in each of the first to fifth embodiments, a configuration may be employed in which the autonomous driving assistance device 200 is provided in the autonomous driving vehicle or the traffic controller.

In the case of a target area in which a plurality of the road-side units RSU are installed, the autonomous driving assistance device 200 has to be provided to only one of the road-side units RSU. In this case, data may be transmitted to and received from the other road-side units RSU.

Although the autonomous driving assistance device 200 has been described as performing object detection and position detection for the target area, the sensor device 100 may be set to have the functions of the object detection unit 202 and the position calculation unit 203, and the autonomous driving assistance device 200 may be set to acquire the results of performing the functions.

Although the disclosure is described above in terms of exemplary embodiments, it should be understood that the various features, aspects, and functionality described in the embodiments are not limited in their applicability to the particular embodiment with which they are described, but instead can be applied, alone or in various combinations to the embodiments of the disclosure.

It is therefore understood that numerous modifications which have not been exemplified can be devised without departing from the scope of the present specification. For example, at least one of the constituent components may be modified, added, or eliminated.

Hereinafter, modes of the present disclosure are summarized as additional notes.

(Additional Note 1)

An autonomous driving assistance device for determining whether or not a specific area is usable, the autonomous driving assistance device comprising:

an object detection unit which detects an object from sensor data acquired by a sensor device which monitors the specific area;

a position calculation unit which calculates a position, in the real world, of the object detected by the object detection unit;

a map information acquisition unit which acquires a position, in the real world, of the specific area;

a determination unit which determines, by using the position of the object calculated by the position calculation unit and the position of the specific area acquired from the map information acquisition unit, whether or not the specific area is usable; and an output unit which outputs a result, of the determination performed by the determination unit, indicating whether or not the specific area is usable.

(Additional Note 2)

The autonomous driving assistance device according to additional note 1, further comprising an occlusion region acquisition unit which acquires, by using the position of the object calculated by the position calculation unit, a region that is occluded by the object.

(Additional Note 3)

The autonomous driving assistance device according to additional note 2, further comprising a degree-of-priority calculation unit which calculates a degree of priority for a specific area determined, by the determination unit, to be usable.

(Additional Note 4)

The autonomous driving assistance device according to additional note 3, further comprising a degree-of-priority parameter acquisition unit which acquires degree-of-priority parameters including at least a parameter regarding a movement efficiency of an autonomous driving vehicle that moves in the specific area, wherein the degree-of-priority calculation unit calculates, by using each of the degree-of-priority parameters acquired by the degree-of-priority parameter acquisition unit and a degree-of-priority weight corresponding to the degree-of-priority parameter, the degree of priority for the specific area determined to be usable.

(Additional Note 5)

The autonomous driving assistance device according to any one of additional notes 1 to 4, further comprising a restriction information acquisition unit which acquires restriction information as to whether or not the specific area is usable.

(Additional Note 6)

An autonomous driving assistance system comprising:

the autonomous driving assistance device according to any one of additional notes 1 to 5; and the sensor device which monitors the specific area.

(Additional Note 7)

An autonomous driving assistance system comprising:

the autonomous driving assistance device according to additional note 5;

the sensor device which monitors the specific area; and an operation device through which information is inputted to the autonomous driving assistance device, wherein the restriction information acquisition unit acquires, from the operation device, the restriction information as to whether or not the specific area is usable.

DESCRIPTION OF THE REFERENCE CHARACTERS

1 physical distribution center
2 physical distribution warehouse
5 object
10 autonomous driving assistance system
100 sensor device
200 autonomous driving assistance device
201 sensor data acquisition unit
202 object detection unit
203 position calculation unit
204 map information acquisition unit
205 determination unit
206 output unit
207 occlusion region acquisition unit
208 degree-of-priority calculation unit
209 restriction information acquisition unit
210 degree-of-priority parameter acquisition unit
300 operation device
1001 arithmetic processing circuit
1002 storage device
1003 input/output circuit
1004 communication circuit
PS parking space
RS load reception space
RSU, RSU A, RSU B road-side unit
Tr, TrA trailer
V_self autonomous driving vehicle
OCA occlusion region

What is claimed is:

1. An autonomous driving assistance device for determining whether or not a target area including a plurality of load reception spaces is usable, the autonomous driving assistance device comprising:

an object detector to detect an object from sensor data acquired by a sensor device which monitors the target area and define a two-dimensional (2D) bounding box for the object;

a position calculation circuitry to calculate a real-world position of the object by defining an object position at the 2D bounding box, and transforming the object position from an image coordinate system to a world coordinate system using a homography matrix calculated based on a set of reference points on a ground plane within the target area, a map information acquisition circuitry to acquire a real-world position of the plurality of load reception spaces;

a determination circuitry to determine whether each of the plurality of load reception spaces is usable based on the real-world position of the object and the real-world position of the plurality of load reception spaces; and an output circuitry to transmit to an autonomous driving vehicle, to enable the vehicle to select a usable load reception space among the plurality of load reception spaces.

2. An autonomous driving assistance system comprising:

the autonomous driving assistance device according to claim 1; and the sensor device which monitors the target area.

3. The autonomous driving assistance device according to claim 1, further comprising a restriction information acquisition circuitry to acquire restriction information as to whether or not the target area is usable.

4. An autonomous driving assistance system comprising:

the autonomous driving assistance device according to claim 3; and the sensor device which monitors the target area.

5. An autonomous driving assistance system comprising:

the autonomous driving assistance device according to claim 3;

the sensor device which monitors the target area; and an operation device through which information is inputted to the autonomous driving assistance device, wherein the restriction information acquisition circuitry acquires, from the operation device, the restriction information as to whether or not the target area is usable.

6. The autonomous driving assistance device according to claim 1, further comprising an occlusion region acquisition circuitry to acquire, by using the real-world position of the object calculated by the position calculation circuitry, a region that is occluded by the object.

7. An autonomous driving assistance system comprising:

the autonomous driving assistance device according to claim 6; and the sensor device which monitors the target area.

8. The autonomous driving assistance device according to claim 6, further comprising a restriction information acquisition circuitry to acquire restriction information as to whether or not the target area is usable.

9. An autonomous driving assistance system comprising:

the autonomous driving assistance device according to claim 8; and the sensor device which monitors the target area.

10. An autonomous driving assistance system comprising:

the autonomous driving assistance device according to claim 8;

the sensor device which monitors the target area; and an operation device through which information is inputted to the autonomous driving assistance device, wherein the restriction information acquisition circuitry acquires, from the operation device, the restriction information as to whether or not the target area is usable.

11. The autonomous driving assistance device according to claim 6, further comprising a degree-of-priority calculation circuitry to calculate a degree of priority for a target area determined, by the determination circuitry, to be usable.

12. An autonomous driving assistance system comprising:

the autonomous driving assistance device according to claim 11; and the sensor device which monitors the target area.

13. The autonomous driving assistance device according to claim 11, further comprising a restriction information acquisition circuitry to acquire restriction information as to whether or not the target area is usable.

14. An autonomous driving assistance system comprising:

the autonomous driving assistance device according to claim 13; and the sensor device which monitors the target area.

15. An autonomous driving assistance system comprising:

the autonomous driving assistance device according to claim 13;

the sensor device which monitors the target area; and an operation device through which information is inputted to the autonomous driving assistance device, wherein the restriction information acquisition circuitry acquires, from the operation device, the restriction information as to whether or not the target area is usable.

16. The autonomous driving assistance device according to claim 11, further comprising a degree-of-priority parameter acquisition circuitry to acquire degree-of-priority parameters including at least a parameter regarding a movement efficiency of an autonomous driving vehicle that moves in the target area, wherein the degree-of-priority calculation circuitry to calculate, by using each of the degree-of-priority parameters acquired by the degree-of-priority parameter acquisition circuitry and a degree-of-priority weight corresponding to the degree-of-priority parameter, the degree of priority for the target area determined to be usable.

17. An autonomous driving assistance system comprising:

the autonomous driving assistance device according to claim 16; and the sensor device which monitors the target area.

18. The autonomous driving assistance device according to claim 16, further comprising a restriction information acquisition circuitry to acquire restriction information as to whether or not the target area is usable.

19. An autonomous driving assistance system comprising:

the autonomous driving assistance device according to claim 18; and the sensor device which monitors the target area.

20. An autonomous driving assistance system comprising:

the autonomous driving assistance device according to claim 18;

the sensor device which monitors the target area; and an operation device through which information is inputted to the autonomous driving assistance device, wherein the restriction information acquisition circuitry acquires, from the operation device, the restriction information as to whether or not the target area is usable.

* * * * *